US011909307B2

(12) United States Patent
Tahata et al.

(10) Patent No.: US 11,909,307 B2
(45) Date of Patent: Feb. 20, 2024

(54) POWER CONVERSION DEVICE

(71) Applicant: Mitsubishi Electric Corporation, Tokyo (JP)

(72) Inventors: Kazuyori Tahata, Tokyo (JP); Shuhei Fujiwara, Tokyo (JP); Takuya Kajiyama, Tokyo (JP); Toshiyuki Fujii, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 280 days.

(21) Appl. No.: 17/615,850

(22) PCT Filed: Jun. 12, 2019

(86) PCT No.: PCT/JP2019/023363
§ 371 (c)(1),
(2) Date: Dec. 2, 2021

(87) PCT Pub. No.: WO2020/250358
PCT Pub. Date: Dec. 17, 2020

(65) Prior Publication Data
US 2022/0311328 A1   Sep. 29, 2022

(51) Int. Cl.
*H02M 1/32*   (2007.01)
*H02M 1/00*   (2006.01)
*H02M 7/217*   (2006.01)

(52) U.S. Cl.
CPC ......... *H02M 1/325* (2021.05); *H02M 1/0043* (2021.05); *H02M 7/217* (2013.01)

(58) Field of Classification Search
CPC .. H02M 1/32; H02M 2001/322; H02M 1/325; H02M 2001/327; H02M 1/34;
(Continued)

(56) References Cited

U.S. PATENT DOCUMENTS 9,373,950 B2 *  6/2016  Gao ................... H02M 7/4835
9,800,171 B2 * 10/2017  Tahata ................. H02H 3/087
(Continued)

FOREIGN PATENT DOCUMENTS

JP    2002058257 A    2/2002
JP    2005094874 A    4/2005
(Continued)

OTHER PUBLICATIONS

Communication pursuant to Article 94(3) EPC dated Apr. 18, 2023, issued in the corresponding European Patent Application No. 19933035.8, 7 pages.
(Continued)

*Primary Examiner* — Jeffrey A Gblende
(74) *Attorney, Agent, or Firm* — BUCHANAN INGERSOLL & ROONEY PC

(57) ABSTRACT

A power conversion device includes a power converter including a plurality of arms and a control device to control voltages of a plurality of sub modules by PWM control using a carrier signal for each sub module. The sub module includes a plurality of switching elements, a power storage element, a pair of output terminals, and a bypass switch. When the control device detects failure of a sub module in an arm, it performs stop processing for stopping a switching operation of the plurality of switching elements included in at least one sub module of the plurality of sub modules in the arm and has the sub module failure of which was detected bypassed. After the control device performs the stop processing, it equalizes intervals among phases of carrier signals of a plurality of normal sub modules in the arm caused by failure of the sub module.

17 Claims, 15 Drawing Sheets

(58) Field of Classification Search
CPC ..... H02M 2001/342; H02M 2001/344; H02M 2001/346; H02M 2001/348; H02M 1/36; H02M 1/38; H02M 1/42; H02M 1/4208; H02M 1/4216; H02M 1/4225; H02M 1/4233; H02M 1/4241; H02M 1/425; H02M 1/4258; H02M 1/4266; H02M 2001/4275; H02M 2001/4283; H02M 2001/4291; H02M 3/1582; H02M 3/156; H02M 3/157; H02M 3/1584; H02M 3/1586; H02M 3/285; H02M 3/33561; H02M 7/49; H02M 1/045; H02M 7/006; H02M 7/06; H02M 7/068; H02M 7/153; H02M 7/10; H02M 1/088; H02M 7/103; H02M 7/106; H02M 7/19; H02M 7/08; H02M 7/17; H02M 2001/007; H02M 7/493; H02M 7/53806; H02M 7/5381; H02M 7/483; H02M 7/217; H02M 7/538466; H02M 7/5387; H02M 7/53871; H02M 7/53873; H02M 7/53875; H02M 1/084; H02M 1/0845; H02M 1/007; H02M 1/0009; H02M 1/08; H02M 3/1588; H02M 7/5395; H02M 1/14; H02M 1/0043; H02J 3/46; H02J 3/38
See application file for complete search history.

(56) References Cited

U.S. PATENT DOCUMENTS 9,871,437 B2 * 1/2018 Hur .................... H02M 1/32
2017/0012521 A1 1/2017 Jimichi et al.

FOREIGN PATENT DOCUMENTS

| JP | 2015012726 A | 1/2015 |
| WO | 2015056570 A1 | 4/2015 |
| WO | 2015133365 A1 | 9/2015 |

OTHER PUBLICATIONS

International Search Report (PCT/ISA/210) with translation and Written Opinion (PCT/ISA/237) dated Aug. 27, 2019, by the Japan Patent Office as the International Searching Authority for International Application No. PCT/JP2019/023363. (9 pages).

Extended European Search Report dated May 17, 2022, issued in corresponding European Patent Application No. 19933035.8, 11 pages.

Yang, et al., "Seamless Fault-Tolerant Operation of a Modular Multilevel Converter With Switch Open-Circuit Fault Diagnosis in a Distributed Control Architecture", IEEE Transactions On Power Electronics, vol. 33, No. 8, Aug. 2018, pp. 7058-7070.

* cited by examiner (a) (b)

POWER CONVERSION DEVICE

TECHNICAL FIELD

The present disclosure relates to a power conversion device.

BACKGROUND ART

A modular multilevel converter (which will be referred to as an MMC converter below) in which a plurality of unit converters are cascaded can readily address a higher voltage by increasing the number of unit converters. The "unit converter" is also referred to as a "sub module" or a "converter cell."

The MMC converter has widely been applied to power transmission and distribution systems as a high-capacity static var compensator or an alternating-current (AC)-direct-current (DC) power conversion device for high-voltage DC power transmission. The sub module includes a plurality of switching elements and a power storage element. Even when a sub module fails in the MMC converter, the MMC converter can continue operating by bypassing the failed sub module.

A power conversion device according to WO2015/133365 (PTL 1) closes a bypass element when abnormality of a converter cell (that is, a sub module) is sensed, and simultaneously with or before closing of the bypass element, the power conversion device turns on a semiconductor element selected from among a plurality of semiconductor elements to form, in parallel to this bypass element, a current path not including the bypass element.

CITATION LIST

Patent Literature

PTL 1: WO2015/133365

SUMMARY OF INVENTION

Technical Problem

In the MMC converter for which pulse width modulation (PWM) is adopted, carrier signals are equalized such that sub modules equally operate. The power conversion device according to PTL 1 prevents a bypass element to close an output terminal at the time of occurrence of abnormality of the sub module from suffering from damages caused by such a closing operation, and continues operating. When the power conversion device continues operating with a failed sub module being short-circuited as in PTL 1, however, the failed sub module does not respond to a distributed carrier signal. Since carrier signals of normal sub modules are thus not equalized, control may become unstable.

An object in one aspect of the present disclosure is to return to usual operations without control becoming unstable in the event of failure of a sub module in a power conversion device.

Solution to Problem

A power conversion device according to one embodiment includes a power converter including a plurality of arms, each arm including a plurality of sub modules connected in series. The power conversion device further includes a control device to control voltages of the plurality of sub modules by PWM control using a carrier signal for each sub module. The sub module includes a plurality of switching elements, a power storage element, a pair of output terminals, and a bypass switch to bypass the sub module. When the control device detects failure of a sub module in the arm, the control device performs stop processing for stopping a switching operation of the plurality of switching elements included in at least one sub module of the plurality of sub modules in the arm and has a sub module failure of which was detected bypassed. After the control device performs the stop processing, the control device equalizes intervals among phases of carrier signals of a plurality of normal sub modules in the arm caused by failure of the sub module.

Advantageous Effects of Invention

According to the present disclosure, a power conversion device returns to usual operations without control becoming unstable in the event of failure of a sub module.

DESCRIPTION OF EMBODIMENTS

Figure 1:
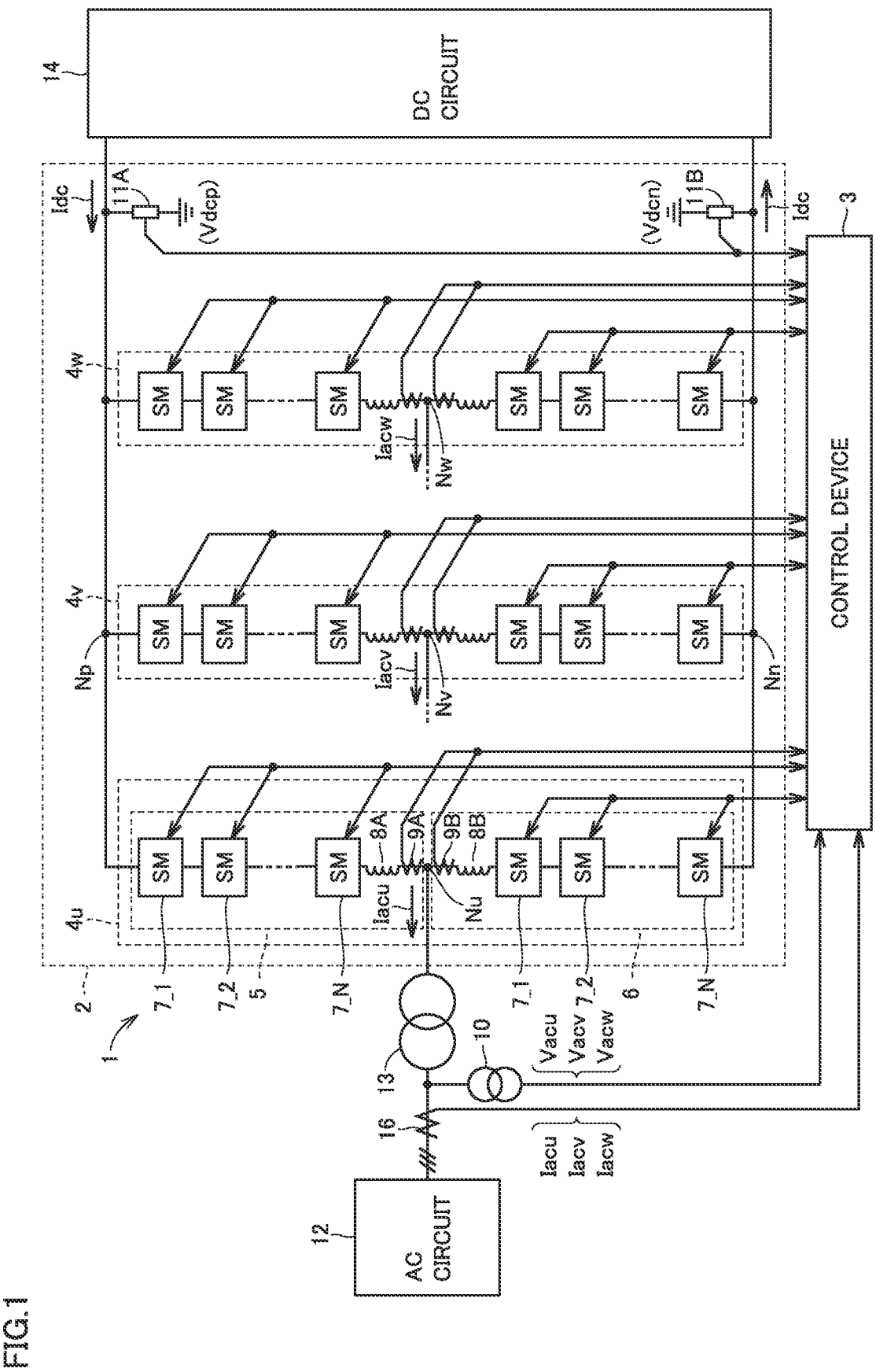
FIG. 1 is a schematic configuration diagram of a power conversion device 1.

An embodiment of the present disclosure will be described below with reference to the drawings. In the description below, the same elements have the same reference characters allotted and their labels and functions are also the same.

Therefore, detailed description thereof will not be repeated.

First Embodiment

<Overall Configuration of Power Conversion Device>

FIG. 1 is a schematic configuration diagram of a power conversion device 1. Referring to FIG. 1, power conversion device 1 is configured of a modular multilevel converter which includes multiple sub modules (corresponding to "SM" in FIG. 1) 7 connected in series. Power conversion device 1 converts power between a DC circuit 14 and an AC circuit 12. Power conversion device 1 includes a power converter 2 and a control device 3.

Power converter 2 includes multiple leg circuits 4u, 4v, 4w (will be described as a "leg circuit 4" when referred to collectively or when referring to any leg circuit) which are connected in parallel between a positive DC terminal (i.e., a high-potential-side DC terminal) Np and a negative DC terminal (i.e., a low-potential-side DC terminal) Nn.

Leg circuit 4 is provided for each of multiple phases constituting an alternating current. Leg circuit 4 is connected between AC circuit 12 and DC circuit 14, and converts power between the circuits. AC circuit 12 shown in FIG. 1 is a three-phase AC circuit which includes three leg circuits 4u, 4v, 4w corresponding to a U phase, a V phase, and a W phase, respectively.

AC input terminals Nu, Nv, Nw provided for respective leg circuits 4u, 4v, 4w are connected to AC circuit 12 via a transformer 13. AC circuit 12 is, for example, an AC power system which includes an AC power supply, etc. For ease of illustration, FIG. 1 does not show connection between AC input terminals Nv, Nw and transformer 13.

High-potential-side DC terminal Np and low-potential-side DC terminal Nn, which are connected in common to each leg circuit 4, are connected to DC circuit 14. DC circuit 14 is, for example, a DC power system, including a DC power grid, or a DC terminal of other power conversion devices.

AC input terminals Nu, Nv, Nw may be connected to AC circuit 12 via an interconnection reactor, instead of transformer 13 in FIG. 1. Furthermore, instead of AC input terminals Nu, Nv, Nw, a primary winding may be provided for each of leg circuits 4u, 4v, 4w, and leg circuits 4u, 4v, 4w may be connected to transformer 13 or an interconnection reactor in an AC manner via a secondary winding magnetically coupled to the primary winding. In this case, the primary winding may be reactors 8A, 8B described below. In other words, leg circuit 4 is electrically (i.e., a DC manner or an AC manner) connected to AC circuit 12 via the connector provided for each of leg circuits 4u, 4v, 4w, such as AC input terminals Nu, Nv, Nw or the above primary winding.

Leg circuit 4u includes an upper arm 5 from high-potential-side DC terminal Np to AC input terminal Nu, and a lower arm 6 from low-potential-side DC terminal Nn to AC input terminal Nu. AC input terminal Nu, which is the point of connection between upper arm 5 and lower arm 6, is connected to transformer 13. High-potential-side DC terminal Np and low-potential-side DC terminal Nn are connected to DC circuit 14. Leg circuits 4v, 4w have the same configuration as leg circuit 4u, and leg circuit 4u will thus be representatively described below.

Upper arm 5 includes multiple cascade-connected sub modules 7_1 to 7_N and reactor 8A. In upper arm 5, multiple sub modules 7_1 to 7_N and reactor 8A are connected in series. Similarly, lower arm 6 includes multiple cascade-connected sub modules 7_1 to 7_N and reactor 8B. In lower arm 6, multiple sub modules 7_1 to 7_N and reactor 8B are connected in series. In the description below, the number of sub modules included in each of upper arm 5 and lower arm 6 is set to N. N is set to N≥2. Sub modules 7_1 to 7_N may also collectively be denoted as a sub module 7. An index i to the sub module is irrelevant to physical arrangement of the sub module.

Reactor 8A may be inserted anywhere in upper arm 5 of leg circuit 4u. Reactor 8B may be inserted anywhere in lower arm 6 of leg circuit 4u. Multiple reactors 8A and multiple reactors 8B may be present. The reactors may have different inductance values. Only reactor 8A of upper arm 5 may be provided, or only reactor 8B of lower arm 6 may be provided.

Reactors 8A, 8B are provided to suppress a circulating current and to prevent a rapid increase of a fault current in the event of a fault of AC circuit 12 or DC circuit 14.

As detectors for measuring the electrical quantities (for example, current, voltage, etc.) for use in the control, power conversion device 1 includes an AC voltage detector 10, an AC current detector 16, DC voltage detectors 11A, 11B, and arm current detectors 9A, 9B. Arm current detectors 9A, 9B are provided for each leg circuit 4. Signals detected by these detectors are input to control device 3.

Note that, for ease of illustration, in FIG. 1, some of signal lines for the signals input from the detectors to control device 3 and signal lines for the signals input/output to/from control device 3 and each sub module 7 are depicted collectively, but they are, in practice, provided for each detector and each sub module 7. The signal lines may be provided separately for transmission and reception of the signals between each sub module 7 and control device 3. For example, an optical fiber may be adopted as the signal line.

In the following, each detector is described in detail.

AC voltage detector 10 detects a U-phase AC voltage Vacu, a V-phase AC voltage Vacv, and a W-phase AC voltage Vacw of AC circuit 12. In the description below, Vacu, Vacv, and Vacw are collectively denoted as Vac.

AC current detector 16 detects a U-phase AC current Iacu, a V-phase AC current Iacv, and a W-phase AC current Iacw of AC circuit 12. In the description below, Iacu, Iacv, and Iacw are collectively denoted as Iac.

DC voltage detector 11A detects a DC voltage Vdcp of high-potential-side DC terminal Np connected to DC circuit 14. DC voltage detector 11B detects a DC voltage Vdcn of low-potential-side DC terminal Nn connected to DC circuit 14. A difference between DC voltage Vdcp and DC voltage Vdcn is defined as a DC voltage Vdc.

Arm current detectors 9A and 9B, included in leg circuit 4u for U phase, respectively detect an upper arm current Ipu flowing through upper arm 5 and a lower arm current Inu flowing through lower arm 6. Arm current detectors 9A and 9B, included in leg circuit 4v for V phase, detect an upper arm current Ipv and a lower arm current Inv, respectively. Arm current detectors 9A and 9B, included in leg circuit 4w for W phase, detect an upper arm current Ipw and a lower arm current Inw, respectively. In the description below, upper arm currents Ipu, Ipv, and Ipw are collectively denoted as an upper arm current Iarmp, lower arm currents Inu, Inv, and Inw are collectively denoted as a lower arm current Iarmn, and upper arm current Iarmp and lower arm current Iarmn are collectively denoted as an arm current Iarm.

<Configuration of Sub Module>

Figure 2:
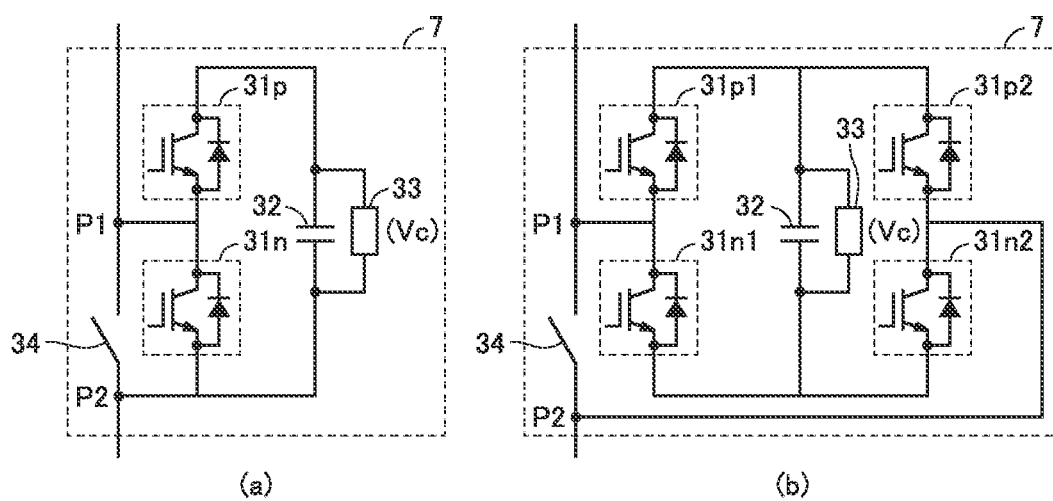
FIG. 2 is a circuit diagram showing an exemplary sub module included in each leg circuit in FIG. 1.

FIG. 2 is a circuit diagram showing an exemplary sub module included in each leg circuit in FIG. 1. Specifically, sub module 7 shown in FIG. 2 (a) has a circuit configuration called a half-bridge configuration. This sub module 7 includes a serial body formed by connecting two switching elements 31p and 31n to each other in series, a power storage element 32, a bypass switch 34, and a voltage detector 33. The serial body and power storage element 32 are connected in parallel.

Opposing terminals of switching element 31n are defined as input and output terminals P1 and P2. A voltage across ends of power storage element 32 and a zero voltage are provided as a result of switching operations by switching elements 31p and 31n. For example, when switching element 31p is turned on and switching element 31n is turned off, the voltage across ends of power storage element 32 is provided. When switching element 31p is turned off and switching element 31n is turned on, the zero voltage is provided. In FIG. 2 (a), opposing terminals of switching element 31n are defined as input and output terminals P1 and P2, however, opposing terminals of switching element 31p may be defined as input and output terminals P1 and P2, and in that case, operations are reverse.

Bypass switch 34 is connected between input and output terminals P1 and P2. In FIG. 2 (a), bypass switch 34 is connected in parallel to switching element 31n. When opposing terminals of switching element 31p are defined as input and output terminals P1 and P2, however, bypass switch 34 is connected in parallel to switching element 31p. By turning on bypass switch 34, sub module 7 is short-circuited. As sub module 7 is short-circuited, sub module 7 is bypassed and power converter 2 can continue operating with remaining normal sub modules. Switching elements 31p and 31n included in sub module 7 are protected against an overcurrent produced at the time of a fault.

Voltage detector 33 detects a voltage Vc across ends of power storage element 32.

Sub module 7 shown in FIG. 2 (b) has a circuit configuration called a full-bridge configuration. This sub module 7 includes a first serial body formed by connecting two switching elements 31p1 and 31n1 to each other in series, a second serial body formed by connecting two switching elements 31p2 and 31n2 to each other in series, power storage element 32, bypass switch 34, and voltage detector 33. The first serial body, the second serial body, and power storage element 32 are connected in parallel.

A point intermediate between switching element 31p1 and switching element 31n1 and a point intermediate between switching element 31p2 and switching element 31n2 are defined as input and output terminals P1 and P2 of sub module 7. The voltage across ends of power storage element 32 or the zero voltage is provided as a result of switching operations by switching elements 31p1, 31n1, 31p2, and 31n2.

Bypass switch 34 is connected between input and output terminals P1 and P2. Bypass switch 34 is connected in parallel to a serial body of switching elements 31n1 and 31n2. By turning on bypass switch 34, sub module 7 is short-circuited. As sub module 7 is short-circuited, the power converter can continue operating with remaining normal sub modules.

Voltage detector 33 detects voltage Vc across ends of power storage element 32.

In FIGS. 2 (a) and (b), switching elements 31p, 31n, 31p1, 31n1, 31p2, and 31n2 are configured, for example, by connection of a freewheeling diode (FWD) in anti-parallel to a self-arc-extinguishing semiconductor switching element such as an insulated gate bipolar transistor (IGBT), a gate commutated turn-off (GCT) thyristor, and a metal oxide semiconductor field-effect transistor (MOSFET).

In FIGS. 2 (a) and (b), a capacitor such as a film capacitor is mainly employed as power storage element 32. Power storage element 32 may be referred to as a capacitor 32 in the description below. Voltage Vc is also referred to as a capacitor voltage Vc.

An example in which sub module 7 has the half-bridge cell configuration shown in FIG. 2 (a), a semiconductor switching element is employed as the switching element, and a capacitor is employed as the power storage element will be described below by way of example. Sub module 7 included in power converter 2, however, may have the full-bridge configuration shown in FIG. 2 (b). A sub module in a configuration other than the configuration shown above, such as a sub module to which a circuit configuration called a clamped double cell is applied, may be employed, and the switching element and the power storage element are not limited to the above either.

<Control Device>

Figure 3:
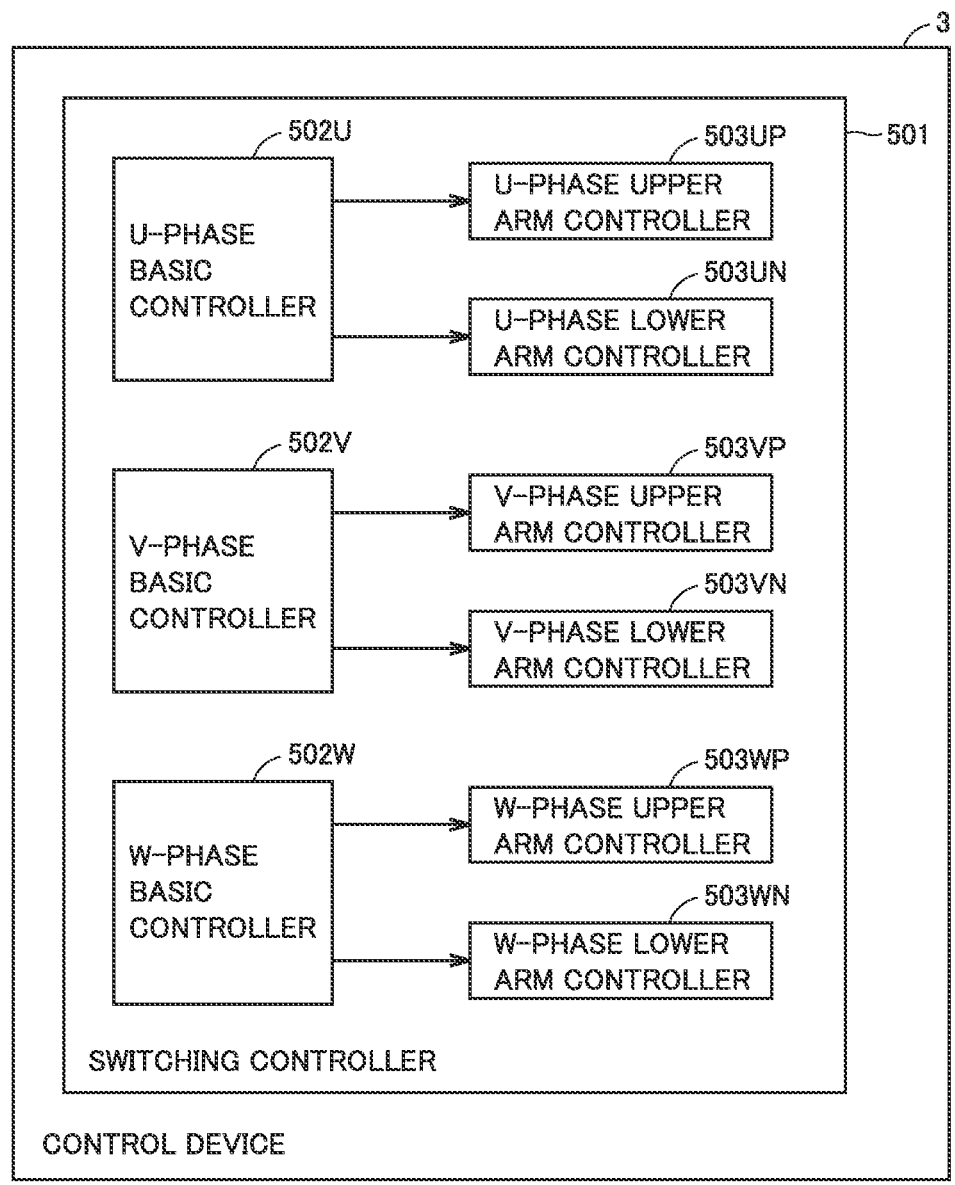
FIG. 3 is a diagram showing an internal configuration of a control device according to a first embodiment.

FIG. 3 is a diagram showing an internal configuration of a control device 3 according to a first embodiment. Referring to FIG. 3, control device 3 includes a switching controller 501. Switching controller 501 controls on and off of switching elements 31p and 31n of sub module 7.

Switching controller 501 includes a U-phase basic controller 502U, a U-phase upper arm controller 503UP, a U-phase lower arm controller 503UN, a V-phase basic controller 502V, a V-phase upper arm controller 503VP, a V-phase lower arm controller 503VN, a W-phase basic controller 502W, a W-phase upper arm controller 503WP, and a W-phase lower arm controller 503WN.

In the description below, U-phase basic controller 502U, V-phase basic controller 502V, and W-phase basic controller 502W are collectively denoted as a basic controller 502. U-phase upper arm controller 503UP, U-phase lower arm controller 503UN, V-phase upper arm controller 503VP, V-phase lower arm controller 503VN, W-phase upper arm controller 503WP, and W-phase lower arm controller 503WN are collectively denoted as an arm controller 503.

Figure 4:
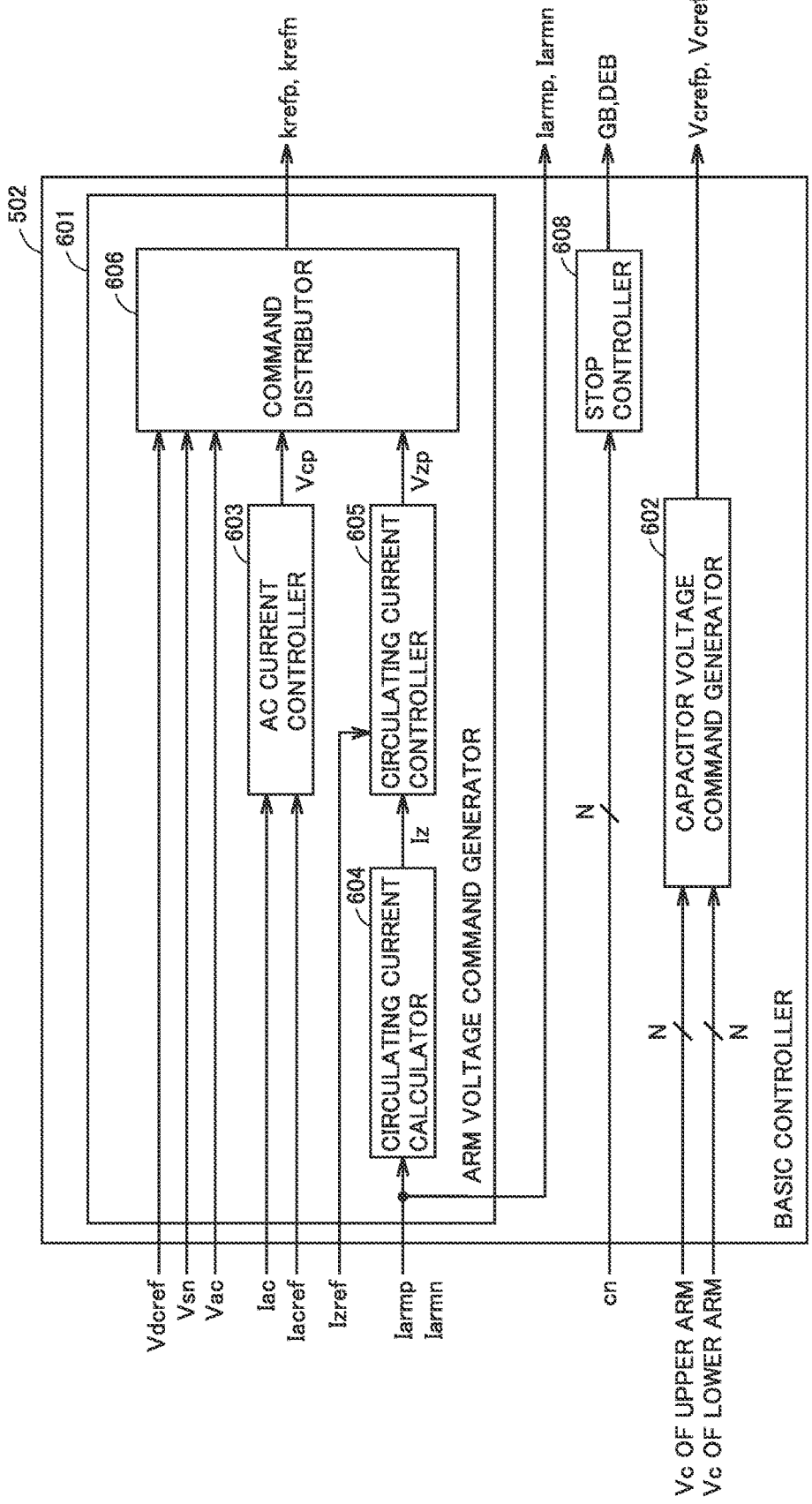
FIG. 4 is a diagram showing a configuration of a basic controller according to the first embodiment.

FIG. 4 is a diagram showing a configuration of basic controller 502 according to the first embodiment. Referring to FIG. 4, basic controller 502 includes an arm voltage command generator 601, a capacitor voltage command generator 602, and a stop controller 608.

Arm voltage command generator 601 calculates an arm voltage command value krefp for the upper arm and an arm voltage command value krefn for the lower arm. In the description below, krefp and krefn are collectively denoted as kref.

Capacitor voltage command generator 602 receives voltages Vc of capacitors 32 in N sub modules 7 in the upper arm from arm controller 503 corresponding to the upper arm and receives voltages Vc of capacitors 32 in N sub modules 7 in the lower arm from arm controller 503 corresponding to the lower arm.

Capacitor voltage command generator 602 calculates a capacitor command voltage value Vcrefp for capacitors 32 in N sub modules 7 included in the upper arm. Capacitor voltage command generator 602 calculates a capacitor command voltage value Vcrefn for capacitors 32 in N sub modules 7 included in the lower arm. For example, an average voltage of capacitors 32 in N sub modules 7 in the upper arm is defined as capacitor command voltage value Vcrefp and an average voltage of capacitors 32 in N sub modules 7 in the lower arm is defined as capacitor command voltage value Vcrefn. In the description below, Vcrefp and Vcrefn are collectively denoted as Vcref.

Arm voltage command generator 601 includes an AC current controller 603, a circulating current calculator 604, a circulating current controller 605, and a command distributor 606.

AC current controller 603 calculates an AC control command value Vcp such that a difference between detected AC current Iac and a set AC current command value Iacref is set to 0.

Circulating current calculator 604 calculates a circulating current Iz that flows through one leg circuit 4 based on arm current Iarmp in the upper arm and arm current Iarmp in the lower arm. The circulating current is a current that circulates among a plurality of leg circuits 4. For example, circulating current Iz that flows through one leg circuit 4 can be calculated in accordance with expressions (1) and (2) below.

$$Idc=(Ipu+Ipv+Ipw+Inu+Inv+Inw)/2 \qquad (1)$$

$$Iz=(Iarmp+Iarmn)/2-Idc/3 \qquad (2)$$

Circulating current controller 605 calculates a circulation control command value Vzp for controlling circulating current Iz to follow a set circulating current command value Izref such as 0.

Command distributor 606 receives AC control command value Vcp, circulation control command value Vzp, a DC voltage command value Vdcref, a neutral point voltage Vsn, and AC voltage Vac. Since an AC side of power converter 2 is connected to AC circuit 12 with transformer 13 being interposed, neutral point voltage Vsn can be calculated based on a voltage of a DC power supply of DC circuit 14. DC voltage command value Vdcref may be provided under DC output control or may be set to a constant value.

Based on these inputs, command distributor 606 calculates voltages to be supplied by the upper arm and the lower arm. Command distributor 606 determines arm voltage command value krefp for the upper arm and arm voltage command value krefn for the lower arm by subtracting voltage lowering due to an inductance component within the upper arm and the lower arm from respective calculated voltages.

Determined arm voltage command value krefp for the upper arm and arm voltage command value krefn for the lower arm serve as output voltage commands to control AC current Iac to follow AC current command value Iacref, to control circulating current Iz to follow circulating current command value Izref, to control DC voltage Vdc to follow DC voltage command value Vdcref, and to feedforward-control AC voltage Vac.

When stop controller 608 detects failure of sub module 7, it provides a gate block command (which is also referred to as a "GB command" below). Stop controller 608 detects failure of each sub module 7 based on a normality determination signal cn for each sub module 7 received from arm controller 503. Details of normality determination signal cn will be described later. Failure of sub module 7 is not limited to failure of an element but refers to a state that sub module 7 does not operate as instructed by control device 3. For example, failure of sub module 7 includes failure of a switching element, failure of a gate driver, break of a capacitor, break of a bus bar, and communication abnormality.

In one aspect, when stop controller 608 detects failure of at least one sub module 7_j among sub modules 7_1 to 7_N in the upper arm or the lower arm, it provides a GB command to turn off all sub modules 7 included in the upper arm and the lower arm. For example, when stop controller 608 of U-phase basic controller 502U detects failure of sub module 7_j in the U-phase upper arm, it provides the GB command to turn off each sub module 7 in the U-phase upper arm and each sub module 7 in the U-phase lower arm.

Gate blocking of each sub module 7 of other phases may be carried out. For example, when failure of sub module 7_j in the U-phase upper arm is detected, stop controller 608 of U-phase basic controller 502U may provide the GB command to turn off each sub module 7 in the U-phase upper and lower arms, stop controller 608 of V-phase basic controller 502V may provide the GB command to turn off each sub module 7 in the V-phase upper and lower arms, and stop controller 608 of W-phase basic controller 502W may provide the GB command to turn off each sub module 7 in the W-phase upper and lower arms. All sub modules 7 included in power converter 2 are thus in a gate-blocked state.

When failure of sub module 7 in the upper arm of a certain phase is detected, gate blocking of each sub module 7 in the upper arm of each phase may be carried out, and when failure of sub module 7 in the lower arm of a certain phase is detected, gate blocking of each sub module 7 in the lower arm of each phase may be carried out. For example, when failure of sub module 7_j in the U-phase upper arm is detected, stop controller 608 of U-phase basic controller 502U may provide the GB command to turn off each sub module 7 in the U-phase upper arm, stop controller 608 of V-phase basic controller 502V may provide the GB command to turn off each sub module 7 in the V-phase upper arm, and stop controller 608 of W-phase basic controller 502W may provide the GB command to turn off each sub module 7 in the W-phase upper arm. All sub modules 7 included in the upper arm of all phases (that is, the U phase, the V phase, and the W phase) are set to the gate-blocked state. This is also applicable to the case of the lower arm.

Gate blocking herein means stopping an operation to switch between on and off of each switching element.

In another aspect, when stop controller 608 detects failure of sub module 7_j in an arm (for example, in the upper arm), it provides the GB command to turn off each sub module 7 in that arm. In this case, gate blocking of each sub module 7 in that arm (for example, in the upper arm) including sub module 7 failure of which was detected is carried out, whereas gate blocking of each sub module 7 in an arm (for example, in the lower arm) not including sub module 7 failure of which was detected is not carried out.

Stop controller 608 provides a deblocking command (which is also referred to as a "DEB command" below) to set sub module 7 back to a deblocked state from the gate-blocked state based on a defined condition. Each switching element in sub module 7 can thus perform an operation to switch between on and off. Timing of output of the DEB command will be described later.

Basic controller 502 provides arm current Iarmp of the upper arm, arm current Iarmn of the lower arm, arm voltage command value krefp for the upper arm, arm voltage command value krefn for the lower arm, capacitor command voltage value Vcrefp for the upper arm, capacitor command voltage value Vcrefn for the lower arm, the GB command, and the DEB command.

Figure 5:
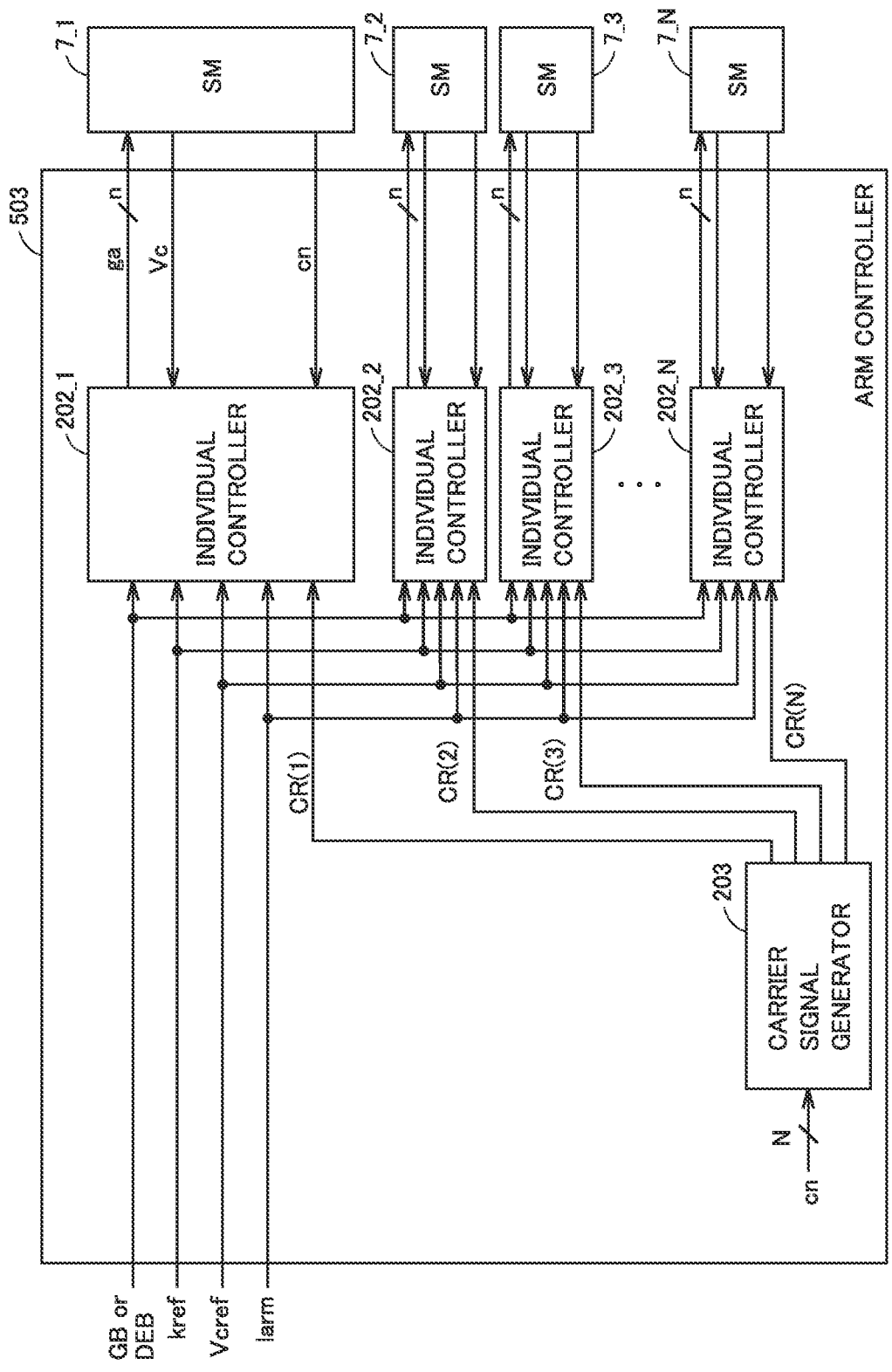
FIG. 5 is a diagram showing a configuration of an arm controller.

FIG. 5 is a diagram showing a configuration of arm controller 503. Referring to FIG. 5, when arm controller 503 detects failure of sub module 7_j among sub modules 7_1 to 7_N, it rectifies uneven intervals among phases of carrier signals of normal sub modules 7_i (in this case, i=1 to j-1 and j+1 to N) within the arm caused by failure of failed sub module 7_j.

Arm controller 503 includes N individual controllers 202_1 to 202_N and a carrier signal generator 203. In the description below, individual controllers 202_1 to 202_N may also collectively be denoted as an individual controller 202.

Individual controller 202_i individually controls corresponding sub module 7_i. Individual controller 202_i receives arm voltage command value kref, arm current Iarm, capacitor command voltage value Vcref, the GB command, and the DEB command from basic controller 502.

Individual controller 202_i receives normality determination signal cn from corresponding sub module 7_i. The normality determination signal is set to "1" when sub module 7 is normal, and the normality determination signal is set to "0" when sub module 7 has failed. Individual controller 202_i transmits normality determination signal cn to basic controller 502. Stop controller 608 of basic controller 502 can thus determine whether or not failure has occurred in each of N sub modules 7 in each arm.

When the normality determination signal received from sub module 7_i is set to "0", individual controller 202_i detects failure of sub module 7_i. Individual controller 202_i has failed sub module 7_i bypassed by turning on bypass switch 34 of failed sub module 7_i in the arm.

Individual controller 202_i receives capacitor voltage Vc from corresponding sub module 7_i. Individual controller 202_i transmits capacitor voltage Vc to basic controller 502.

Carrier signal generator 203 receives normality determination signals cn for N sub modules 7 in the arm. Carrier signal generator 203 may receive normality determination signal cn from each individual controller 202 or from each sub module 7. Carrier signal generator 203 can thus determine which sub module 7 in the arm is normal and which sub module 7 has failed.

Carrier signal generator 203 sets a reference phase of a carrier signal for each sub module 7 and generates a carrier signal having the set reference phase. Specifically, before failure of any sub module 7 within the arm, carrier signal generator 203 sets reference phases of a plurality of carrier signals CR(i) (which may also be referred to as a "carrier reference phase" below) at intervals calculated by division of 360 degrees by the number N of sub modules 7_i. The reference phase of carrier signal CR(i) refers to a difference between a phase of carrier signal CR(i) and a phase defined as the reference. The phase of a carrier signal CR(0) can be adopted as the phase to be defined as the reference.

Carrier signal generator 203 generates carrier signals CR(1) to CR(N) each having the set carrier reference phase. Thus, a harmonic component in an output voltage from each sub module 7 within the arm can be canceled and an equivalent switching frequency of the output voltage from one arm can be high.

It is assumed that any sub module 7 within the arm fails and the failed sub module is referred to as failed sub module 7_j. In this case, when stop controller 608 of basic controller 502 detects failure of failed sub module 7_j based on the normality determination signal having a value "0" from failed sub module 7_j, it provides the GB command for gate blocking of sub modules 7 in the arm including failed sub module 7_j. Upon receiving the GB command, individual controllers 202_1 to 202_N turn off switching elements 31p and 31n in corresponding sub modules 7.

Individual controller 202 corresponding to failed sub module 7_j turns on bypass switch 34 of failed sub module 7_j to have failed sub module 7_j bypassed. The intervals among the carrier reference phases of the normal sub modules in the arm are uneven. Therefore, when usual operations in which each sub module 7 is operated based on a voltage command are performed in this state, a harmonic component in the output voltage from each sub module 7 within the arm cannot be canceled and the harmonic component in the output voltage from each sub module 7 remains in the output voltage from the arm.

Therefore, after gate blocking of each sub module 7 in the arm and bypass of failed sub module 7_j, carrier signal generator 203 rectifies uneven intervals among the carrier reference phases of the plurality of normal sub modules within the arm. Intervals among the plurality of carrier reference phases before failure of sub module 7_j are calculated as $360°/N(=\phi)$. Failure of sub module 7_j, however, leads to a difference of $2\phi$ between the carrier reference phase immediately preceding the carrier reference phase of failed sub module 7_j and the carrier reference phase immediately following the carrier reference phase of failed sub module 7_j. Rectification of uneven intervals among the carrier reference phases of the plurality of normal sub modules within the arm means setting of the intervals among all carrier reference phases within the arm to be smaller than $2\phi$.

Specifically, carrier signal generator 203 sets the reference phases of the plurality of carrier signals based on intervals calculated by division of 360 degrees by the number (N−1) of the plurality of normal sub modules 7_i. Carrier signal generator 203 sets again the carrier reference phases of the plurality of normal sub modules while failed sub module 7_j in the arm is in the gate-blocked state. Carrier signal generator 203 generates carrier signals CR(1) to CR(j−1) and CR(j+1) to CR(N) having the carrier reference phases set again.

Figure 6:
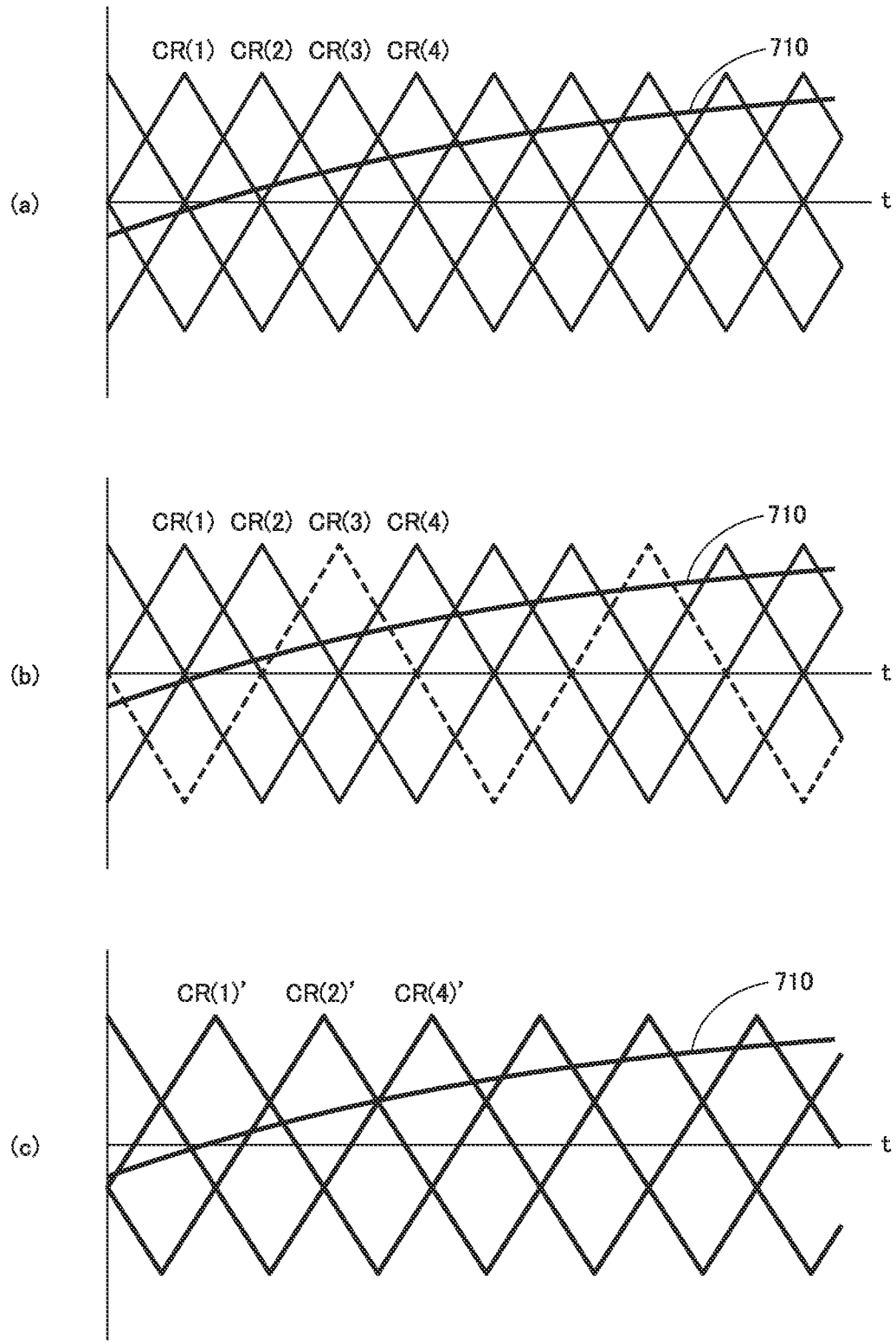
FIG. 6 is a diagram showing variation in carrier signal.

FIG. 6 is a diagram showing variation in carrier signal. For the sake of facilitated description, variation in carrier signal in the event of failure of sub module 7_3 in the arm, with N being set to N=4, will be described.

Referring to FIG. 6 (a), CR(1), CR(2), CR(3), and CR(4) represent carrier signals of sub modules 7_1, 7_2, 7_3, and 7_4 before failure of sub module 7_3, respectively. The carrier signal is, for example, a triangular wave signal. A curve 710 is a curve representing arm voltage command value kref.

Referring to FIG. 6 (b), CR(1), CR(2), CR(3), and CR(4) represent carrier signals immediately after occurrence of failure of sub module 7_3. Carrier signal CR(3) corresponding to failed sub module 7_3 is shown with a dotted line. In this case, intervals among carrier reference phases of a plurality of normal sub modules 7_1, 7_2, and 7_4 in the arm are uneven.

Referring to FIG. 6 (c), carrier signal generator 203 sets again the carrier reference phases of the plurality of normal sub modules 7_1, 7_2, and 7_4. Specifically, carrier signal generator 203 equalizes the intervals among the reference phases of the carrier signals of the plurality of normal sub modules 7_1, 7_2, and 7_4. CR(1)', CR(2)', and CR(4)' represent the carrier signals set again by carrier signal generator 203 after failure of sub module 7_3. Carrier signal generator 203 thus rectifies uneven intervals among the carrier reference phases of the plurality of normal sub modules in the arm.

Referring again to FIG. 5, individual controller 202_i receives carrier signal CRi from carrier signal generator 203. Individual controller 202_i subjects sub module 7_i to PWM control using carrier signal CRi. Specifically, individual controller 202_i generates a gate signal ga for corresponding sub module 7_i based on a voltage command for sub module 7_i and carrier signal CRi, and provides the gate signal to corresponding sub module 7_i.

Figure 7:
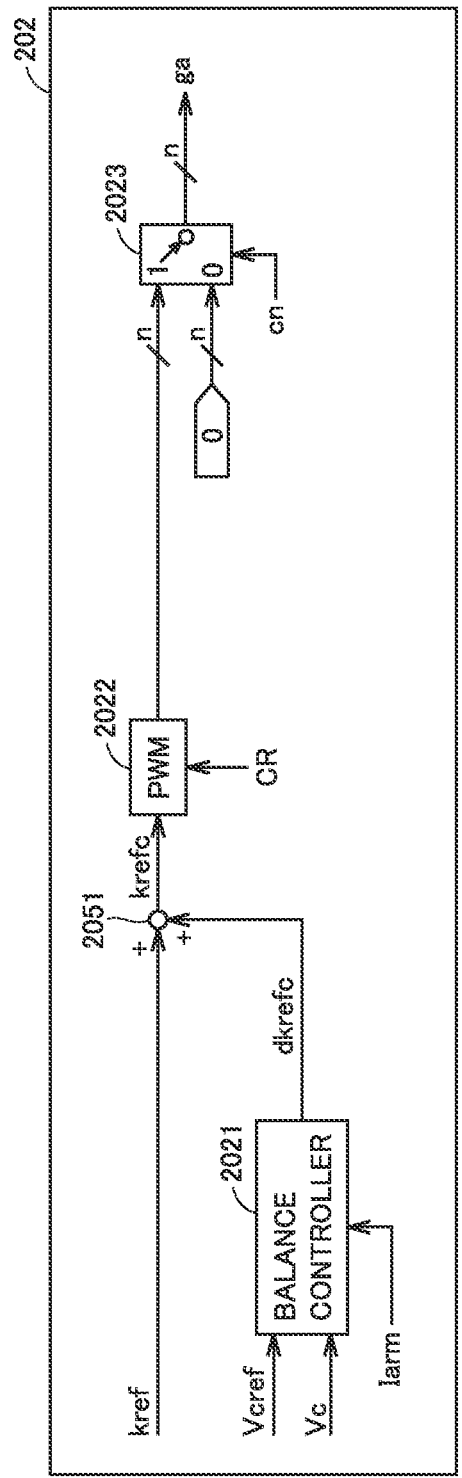
FIG. 7 is a diagram showing an exemplary configuration of an individual controller.

FIG. 7 is a diagram showing an exemplary configuration of individual controller 202. Specifically, in the exemplary configuration in FIG. 7, a configuration for generating gate signal ga in the configuration of individual controller 202 is shown. Referring to FIG. 7, individual controller 202 includes a balance controller 2021, an adder 2051, a PWM modulator 2022, and a signal switch 2023.

Balance controller 2021 provides a balance control output dkrefc such that capacitor voltage Vc matches with capacitor command voltage value Vcref based on capacitor command voltage value Vcref, capacitor voltage Vc of corresponding sub module 7, and arm current Iarm. For example, balance controller 2021 can generate balance control output dkrefc based on a result of multiplication of a difference between Vcref and Vc by a gain K.

Adder 2051 adds arm voltage command value kref and balance control output dkrefc provided from balance controller 2021. A result of addition is provided as sub module voltage command value krefc.

PWM modulator 2022 provides a PWM modulated signal by modulating sub module voltage command value krefc and carrier signal CR(i) in accordance with phase shift PWM. PWM modulator 2022 performs modulation depending on a configuration of sub module 7. Depending on the configuration of sub module 7, the number n of provided PWM modulated signals also increases or decreases. For example, in the case of a half-bridge cell, n is set to n=2, and in the case of a full-bridge cell, n is set to n=4.

Signal switch 2023 receives the PWM modulated signal and a zero signal representing a zero voltage. Signal switch 2023 provides a signal selected depending on normality determination signal cn. When sub module 7_i is normal, normality determination signal cn is set to "1" and the PWM modulated signal is provided. When sub module 7_i fails, normality determination signal cn is set to "0" and the zero signal is provided. The signal provided from signal switch 2023 is sent to a gate driver for switching elements 31p and 31n in corresponding sub module 7_i as gate signal ga to control switching of switching elements 31p and 31n in corresponding sub module 7_i.

When individual controller 202 receives the GB command from basic controller 502, it deactivates gate signal ga (for example, provides a zero signal). When individual controller 202 receives the DEB command from basic controller 502, it activates gate signal ga (for example, provides a PWM modulated signal).

(Hardware Configuration of Control Device 3)

Figure 8:
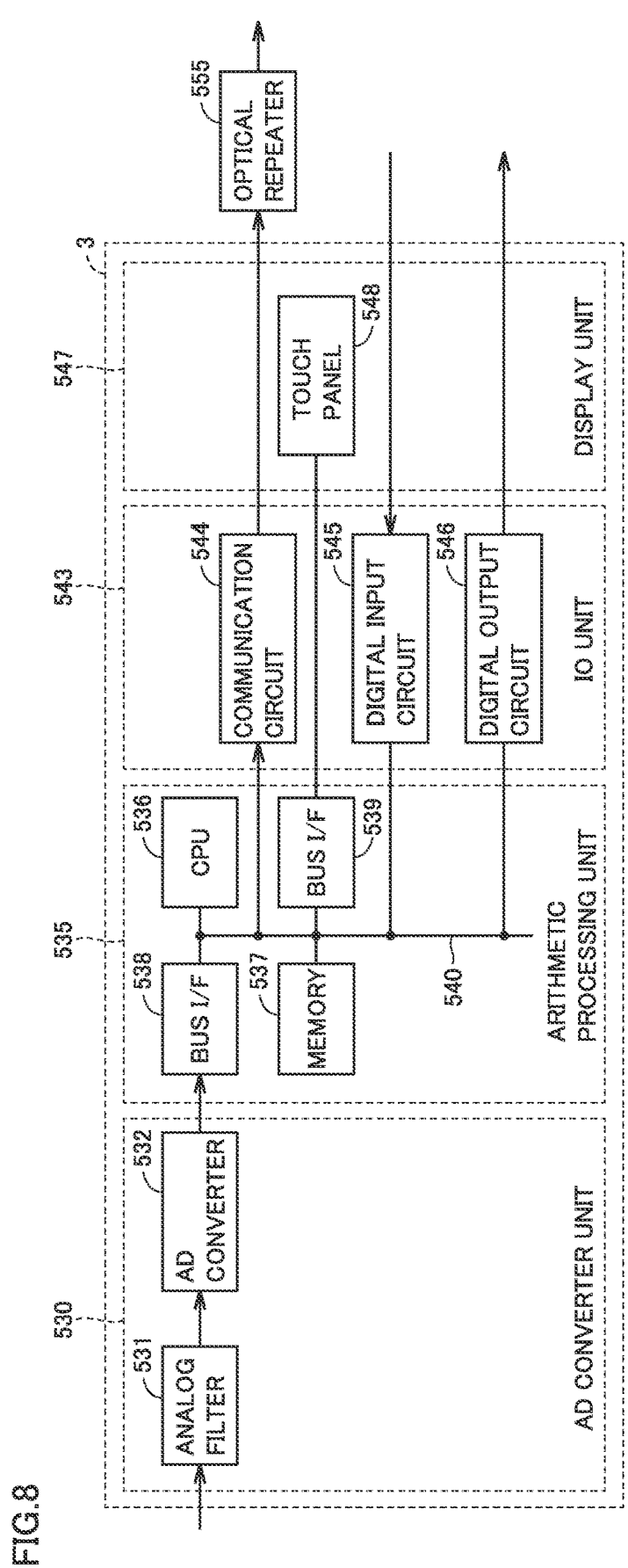
FIG. 8 is a diagram showing an exemplary hardware configuration of the control device.

FIG. 8 is a diagram showing an exemplary hardware configuration of control device 3. Referring to FIG. 8, control device 3 is configured similarly to what is called a digital relay device. Control device 3 includes an analog-digital (AD) converter unit 530, an arithmetic processing unit 535, an input and output (IO) unit 543, and a display unit 547.

In a stage preceding AD converter unit 530, a plurality of transformers (not shown) to convert input signals from arm current detectors 9A and 9B, AC voltage detector 10, AC current detector 16, DC voltage detectors 11A and 11B, and voltage detector 33 to a voltage level suitable for signal processing within control device 3 may be provided.

AD converter unit 530 includes an analog filter 531 and an AD converter 532. Analog filter 531 is a low-pass filter provided to remove an aliasing error in AD conversion. AD converter 532 converts the signal that has passed through analog filter 531 into a digital value.

While FIG. 8 representatively shows only one channel as the input to AD converter unit 530, AD converter unit 530, in practice, has a multiple-input configuration to receive the signals from the respective detectors. Accordingly, more specifically, AD converter unit 530 includes multiple analog filters 531, and a multiplexer (not shown) for selecting signals having passed through analog filters 531.

Arithmetic processing unit 535 includes a central processing unit (CPU) 536, a memory 537, bus interfaces 538, 539, and a bus 540 connecting these components. CPU 536 controls the entire operation of control device 3. Memory 537 is used as a primary storage for CPU 536. Furthermore, by including a nonvolatile memory, such as a flash memory, memory 537 stores programs, and settings values for the signal processing.

Note that arithmetic processing unit 535 may be configured of any circuit that has computing functionality, and is not limited to the example of FIG. 8. For example, arithmetic processing unit 535 may include multiple CPUs. Instead of the processor such as CPU, arithmetic processing unit 535 may be configured of at least one ASIC (Application Specific Integrated Circuit), or at least one FPGA (Field Programmable Gate Array). Alternatively, arithmetic processing unit 535 may be configured of any combination of the processor, ASIC, and FPGA.

IO unit 543 includes a communication circuit 544, a digital input circuit 545, and a digital output circuit 546. Communication circuit 544 generates an optical signal to be provided to each sub module 7. The signal provided from communication circuit 544 is transmitted to sub module 7 through an optical repeater 555. Digital input circuit 545 and digital output circuit 546 are interface circuits for communication between CPU 536 and external devices. For example, digital output circuit 546 provides a trip signal to AC circuit 12.

Display unit 547 includes a touch panel 548 for inputting settling values and for display. Touch panel 548 is an input/output interface which is a combination of a visual display, such as a liquid crystal panel, and an input device, such as a touchpad. Touch panel 548 is connected to bus 540 via bus interface 539.

<Processing Procedure>

Figure 9:
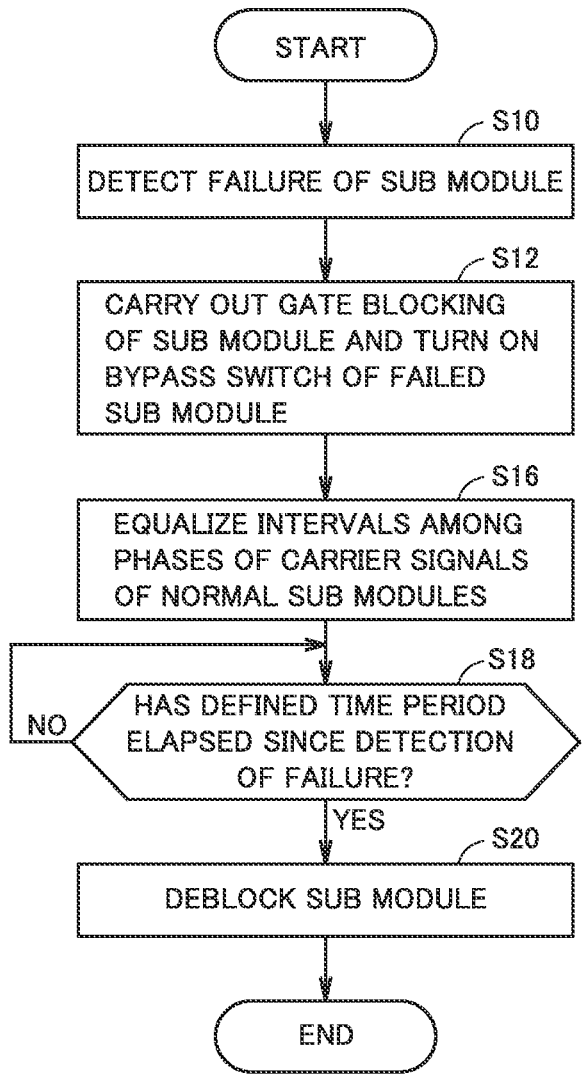
FIG. 9 is a flowchart showing a procedure of processing in the control device according to the first embodiment.

FIG. 9 is a flowchart showing a procedure of processing in control device 3 according to the first embodiment. Typically, arithmetic processing unit 535 of control device 3 performs each step below.

Referring to FIG. 9, control device 3 detects failure of sub module 7_j in an arm based on normality determination signal cn from each sub module 7 in the arm (step S10). Control device 3 stops the switching operation of each switching element included in each sub module 7 by gate blocking of each sub module 7 in the arm and turns on bypass switch 34 of sub module 7_j failure of which was detected (step S12). Specifically, control device 3 turns off switching elements 31p and 31n included in each sub module 7 and provides a turn-on command to bypass switch 34 of sub module 7_j. Sub module 7_j is thus bypassed.

Thus, when control device 3 detects failure of sub module 7_j in step S10, it simultaneously performs in parallel, processing for gate blocking of each sub module 7 and processing for output of the command to turn on bypass switch 34. A time period from output of the gate block command until turn-off of each switching element is sufficiently shorter than a time period from output of the command to turn on bypass switch 34 until turn-on of bypass switch 34.

Control device 3 equalizes intervals among reference phases of carrier signals of the plurality of normal sub modules in the arm caused by failure of sub module 7_j (step S16). Specifically, control device 3 sets the intervals among the reference phases of the plurality of carrier signals of the plurality of normal sub modules 7 to intervals calculated by dividing 360 degrees by the number of normal sub modules 7.

Control device 3 determines whether or not a defined time period has elapsed since detection of failure of sub module 7_j (step S18). This defined time period is set to a time period after lapse of which sub module 7_j can be regarded as having been bypassed (that is, bypass switch 34 can be regarded as having been turned on) as a result of processing in step S12 performed after detection of failure.

When the defined time period has not elapsed (NO in step S18), control device 3 repeats processing in step S18. When the defined time period has elapsed (YES in step S18), regarding bypass switch 34 as having been turned on, control device 3 deblocks each sub module 7 in the arm and cancels stop of operations of each sub module 7 (step S20). Switching elements 31p and 31n included in each sub module 7 can thus perform the operation to switch between on and off and operations of power converter 2 are restarted.

In power converter 2, in order to achieve operations equivalent to power conversion operations (that is, usual operations) while no failure is occurring in sub module 7, design is made to include redundant sub module 7 (for example, such a design that sub modules 7 larger in number at least by one are connected in series). When the number of failed sub modules 7 is larger than the number of redundant sub modules as designed, however, usual operations cannot be performed.

Therefore, when control device 3 detects failure of sub module 7 in step S10, it may determine whether or not the number of normal sub modules 7 is equal to or larger than a defined number. When the number of normal sub modules 7 is equal to or larger than the defined number, control device 3 performs processing from step S12. When the number of normal sub modules 7 is smaller than the defined number, on the other hand, control device 3 completely shuts down power converter 2 and opens a breaker (not shown).

In the flowchart in FIG. 9, a configuration in which control device 3 simultaneously carries out in parallel in step S12, gate blocking of each sub module 7 and output of the command to turn on bypass switch 34 and sets again the reference phases of the carrier signals in step S16 is described. In this case, after gate blocking of sub modules 7, the reference phases of the carrier signals may be set again in step S16 without waiting for turn-on of bypass switch 34.

In the flowchart in FIG. 9, a configuration in which control device 3 determines whether or not the defined time period has elapsed in step S18, and when the defined time period has elapsed, the control device regards bypass switch 34 as having been turned on is described, however, limitation to the configuration is not intended. For example, instead of processing in step S18, control device 3 may perform processing for determining whether or not it has received from sub module 7, a signal indicating that bypass switch 34 has been turned on. When control device 3 receives the signal from sub module 7, it may determine that bypass switch 34 has been turned on, and the control device may deblock each sub module 7 in the arm and cancel stop of operations of each sub module 7 (that is, perform processing in step S20).

<Advantages>

According to the first embodiment, when a sub module fails, gate blocking of each sub module included in the power converter is once carried out, and during this period, intervals among carrier reference phases are set to be equal. Therefore, distortion of the output voltage while the carrier signals are being set again, which results in unfavorable influence on the power system, is prevented. Setting again during gate blocking would not adversely affect voltage balance control in each sub module either. Therefore, each sub module does not suffer from overvoltage and insufficient voltage. Therefore, the power converter can return to usual operations without control of the power converter becoming unstable.

By stopping operations only in an arm including a failed sub module, the power converter can continue operating with another arm even while carrier signals in the arm are set again. Therefore, interchange of electric power to some extent while carrier signals in the arm including the failed sub module are being set again can be expected and flexible operations can be achieved.

Second Embodiment

A configuration in which a GB command is immediately provided after failure of sub module 7 is described in the first embodiment. During a gate blocking period, however, interchange of electric power from power conversion device 1 is restricted. Therefore, when sub module 7 fails during emergency interchange of electric power by power conversion device 1 and gate blocking of power converter 2 is immediately carried out, electric power cannot be interchanged even during emergency situations. In a second embodiment, a configuration in which timing of gate blocking is determined depending on a condition for applying power conversion device 1 will be described.

Figure 10:
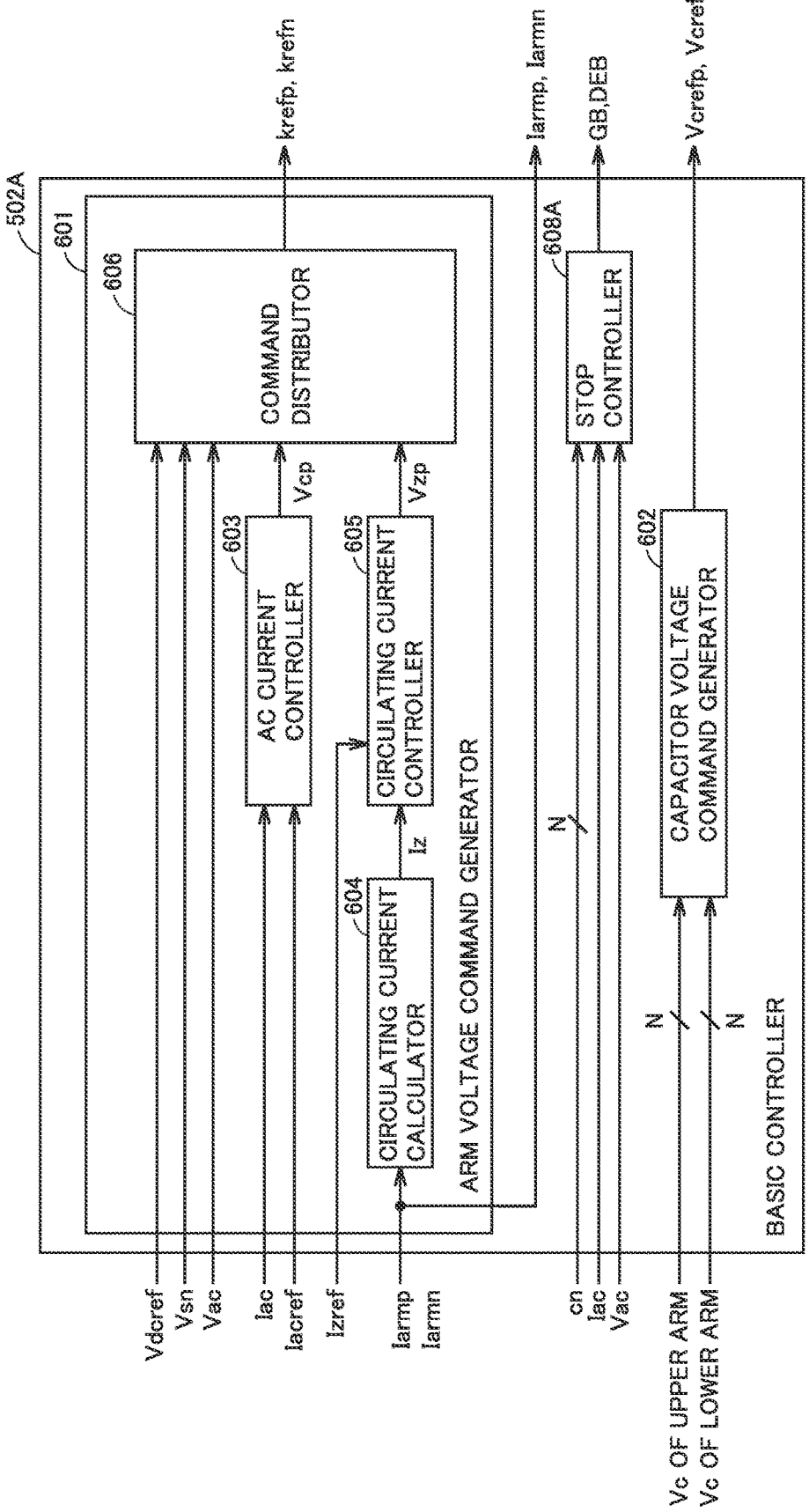
FIG. 10 is a diagram showing a configuration of a basic controller according to a second embodiment.

FIG. 10 is a diagram showing a configuration of a basic controller 502A according to the second embodiment. Basic controller 502A corresponds to the configuration of basic controller 502 in FIG. 4 with stop controller 608 being replaced with a stop controller 608A.

When output power from power converter 2 is low at the time of detection of failure of sub module 7 in an arm, stop controller 608A provides the GB command to turn off sub module 7 in the arm. On the other hand, when output power from power converter 2 is high as in emergency interchange of electric power at the time of detection of failure of sub module 7 in the arm and a certain condition is satisfied, stop controller 608A provides the GB command.

Specifically, stop controller 608A calculates output power from power converter 2 based on AC voltage Vac detected by AC voltage detector 10 and AC current Iac detected by AC current detector 16. Stop controller 608A determines whether or not output power from power converter 2 is equal to or higher than a threshold value Th1 at the time of detection of failure of sub module 7 in the arm.

When output power from power converter 2 is equal to or higher than threshold value Th1 and a predetermined condition is satisfied, stop controller 608A provides the GB command to turn off each sub module 7 in the arm including failed sub module 7. Stop controller 608A may provide the GB command to turn off all sub modules 7 included in the upper arm and the lower arm. The predetermined condition is arbitrarily determined by a system operator. For example, when the system operator determines that output power from power converter 2 may temporarily be restricted even during emergency interchange of electric power, the system operator provides to control device 3, an operation input to instruct control device 3 to provide the GB command. When stop controller 608A accepts the operation input (that is, when the predetermined condition is satisfied), it provides the GB command.

When output power from power converter 2 is lower than threshold value Th1, stop controller 608A provides the GB command regardless of the predetermined condition. When output power from power converter 2 is high and the arm current that flows in power converter 2 is high, a function to balance the capacitor of power converter 2 achieves a sufficient effect. When the arm current is low, however, the function does not sufficiently work, and energy may concentrate in at least one of sub modules 7. Therefore, the capacitor voltage of that at least one converter cell may deviate from a protection level and the power converter may shut down for protection. Therefore, when output power from power converter 2 is lower than threshold value Th1, control device 3 immediately provides the GB command regardless of the predetermined condition and sets the reference phases of the carrier signals again.

According to the second embodiment, when output power from power converter 2 is equal to or higher than threshold value Th1 at the time of detection of failure of sub module 7 in the arm and the predetermined condition is satisfied, control device 3 carries out gate blocking of each sub module 7. When output power from power converter 2 is lower than threshold value Th1 at the time of detection of failure of sub module 7 in the arm, control device 3 carries out gate blocking of each sub module 7 regardless of the predetermined condition. Therefore, when gate blocking is not desirable as in emergency interchange of electric power, such flexible operations as carrying out gate blocking after continuing operations as long as possible in expectation of cancellation of the emergency state can be performed.

Third Embodiment

When gate blocking in power converter 2 is carried out during interchange of electric power from power converter 2 to a power system, the voltage and the current in the power system may significantly vary due to abrupt variation in output power. In a third embodiment, a configuration in which output power from power converter 2 is restricted to lessen variation in voltage and current in the power system and then gate blocking of power converter 2 is carried out will be described.

Figure 11:
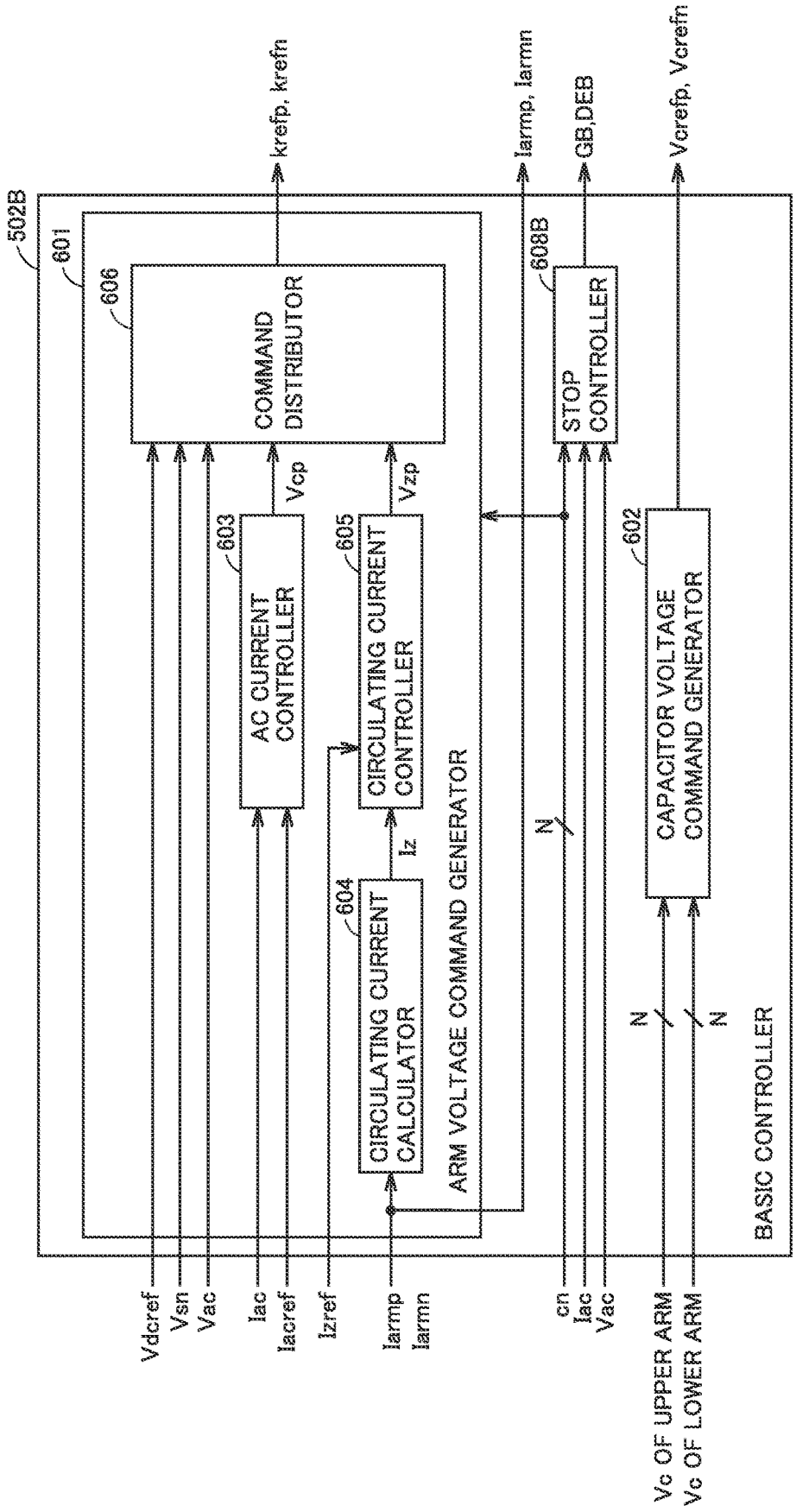
FIG. 11 is a diagram showing a configuration of a basic controller according to a third embodiment.

FIG. 11 is a diagram showing a configuration of a basic controller 502B according to the third embodiment. Basic controller 502B corresponds to the configuration of basic controller 502 in FIG. 4 with stop controller 608 being replaced with a stop controller 608B.

Referring to FIG. 11, arm voltage command generator 601 (for example, command distributor 606) detects failure of each sub module 7 based on normality determination signal cn for each sub module 7 received from arm controller 503. When failure of the sub module in an arm is detected, command distributor 606 determines arm voltage command values krefp and krefn to gradually lower output power from power converter 2.

Stop controller 608B determines whether or not output power from power converter 2 calculated based on AC voltage Vac and AC current Iac becomes lower than a threshold value Th2. When output power from power converter 2 becomes lower than threshold value Th2, stop controller 608B provides the GB command. Stop controller 608B may determine whether or not an output current (for example, AC current Iac) from power converter 2 becomes lower than a threshold value Th3, and when AC current Iac becomes lower than threshold value Th3, stop controller 608B may provide the GB command. Alternatively, stop controller 608B may determine whether or not the arm current in each arm becomes lower than a threshold value Th4, and when the arm current becomes lower than threshold value Th4, it may provide the GB command.

According to the third embodiment, when control device 3 detects failure of sub module 7 in an arm, it gradually lowers output power from power converter 2, and when output power becomes lower than threshold value Th2, it carries out gate blocking of each sub module 7 in the arm. Therefore, unfavorable influence on the voltage and the current in the power system at the time of gate blocking can be suppressed.

Fourth Embodiment

In a fourth embodiment, another configuration for lessening influence on the power system at the time of gate blocking in power converter 2 will be described.

Figure 12:
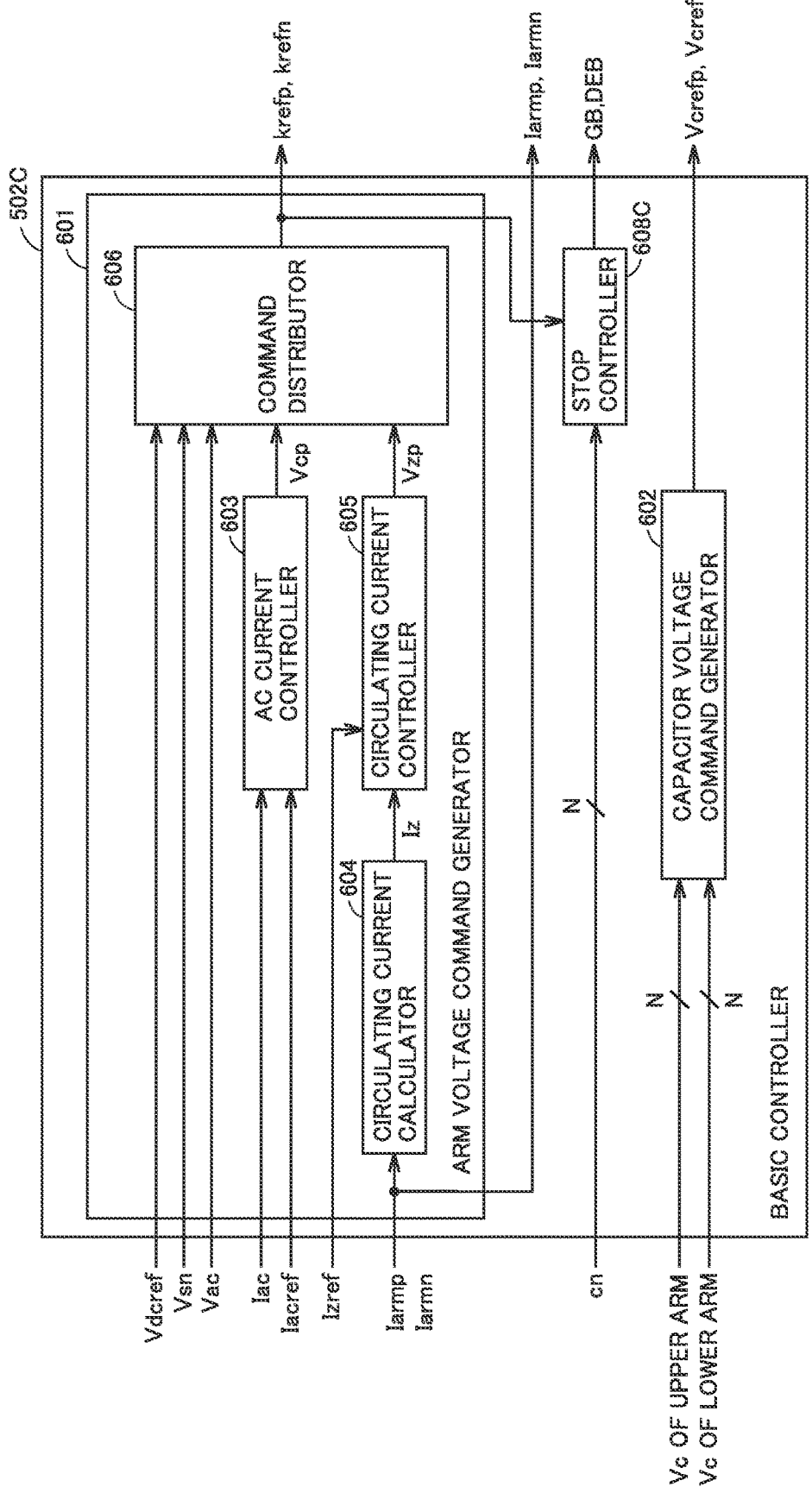
FIG. 12 is a diagram showing a configuration of a basic controller according to a fourth embodiment.

FIG. 12 is a diagram showing a configuration of a basic controller 502C according to the fourth embodiment. Basic controller 502C corresponds to the configuration of basic controller 502 in FIG. 4 with stop controller 608 being replaced with a stop controller 608C.

Referring to FIG. 12, when stop controller 608C detects failure of sub module 7 in an arm, it provides the GB command to stop operations of all sub modules 7 included in the arm as an arm voltage command value attains to a value around maximum modulation or minimum modulation thereof. In the fourth embodiment, gate blocking only in the arm including failed sub module 7 is carried out.

More specifically, stop controller 608C monitors arm voltage command value kref provided from command distributor 606. It is assumed that sub module 7 in the upper arm fails. When stop controller 608C detects failure of sub module 7 in the upper arm, it provides the GB command to stop operations of each sub module 7 in the upper arm at the timing when arm voltage command value krefp for the upper arm becomes equal to or larger than a command value R1. Command value R1 is set to the arm voltage command value around maximum modulation thereof.

When the GB command is provided at the timing when arm voltage command value krefp becomes equal to or larger than command value R1, arm voltage command generator 601 controls arm current Iarmp that flows through the upper arm to flow in the positive direction. Specifically, circulating current controller 605 calculates circulation control command value Vzp for flow of circulating current Iz such that arm current Iarmp flows in the positive direction, and provides the circulation control command value to command distributor 606. In this case, arm voltage command value krefn for the lower arm provided from command distributor 606 serves as an output voltage command for controlling operations of each sub module 7 in the lower arm such that arm current Iarmp that flows through the upper arm flows in the positive direction.

The "positive direction" refers to a direction of flow of the arm current from a side of input and output terminal P1 toward input and output terminal P2 in FIG. 2. Specifically, in sub module 7 in FIG. 2 (a), the positive direction refers to a direction of flow of the arm current in the order of input and output terminal P1, the freewheeling diode of switching element 31p, capacitor 32, and input and output terminal P2. Since the output voltage from each sub module 7 in the upper arm is thus a voltage across opposing ends of capacitor 32, arm voltage command value krefp equal to or larger than command value R1 can be simulated. Therefore, a difference between the output voltage from the upper arm during gate blocking and arm voltage command value krefp can be made smaller.

Alternatively, when stop controller 608C detects failure of sub module 7 in the upper arm, it may provide the GB command at the timing when arm voltage command value krefp for the upper arm becomes smaller than a command value R2 (R2<R1). Command value R2 is set to the arm voltage command value around minimum modulation thereof.

When the GB command is provided at the timing when arm voltage command value krefp becomes smaller than command value R2, arm voltage command generator 601 controls arm current Iarmp that flows through the upper arm to flow in the negative direction. Specifically, circulating current controller 605 calculates circulation control command value Vzp for flow of circulating current Iz such that arm current Iarmp flows in the negative direction and provides the circulation control command value to command distributor 606. In this case, arm voltage command value krefn for the lower arm provided from command distributor 606 serves as an output voltage command for controlling operations of each sub module 7 in the lower arm such that arm current Iarmp that flows through the upper arm flows in the negative direction.

The "negative direction" refers to a direction of flow of the arm current from the side of input and output terminal P2 toward input and output terminal P1 in FIG. 2. Specifically, the negative direction refers to the direction of flow of the arm current in the order of input and output terminal P2, the freewheeling diode of switching element 31n, and input and output terminal P1 in sub module 7 in FIG. 2 (*a*). Since the output voltage from each sub module 7 in the upper arm is thus a zero voltage, arm voltage command value krefp smaller than command value R2 can be simulated. Therefore, a difference between the output voltage from the upper arm during gate blocking and arm voltage command value krefp can be made smaller.

According to the fourth embodiment, when control device 3 detects failure of sub module 7 in an arm, it carries out gate blocking of a plurality of sub modules 7 in the arm at the timing when the arm voltage command value becomes equal to or larger than command value R1, and controls the arm current that flows through the arm to flow in the positive direction. Alternatively, when control device 3 detects failure of sub module 7 in an arm, it carries out gate blocking of a plurality of sub modules 7 in the arm at the timing when the arm voltage command value becomes smaller than command value R2 and controls the arm current that flows through the arm to flow in the negative direction. Therefore, influence on the power system during gate blocking can be lessened.

Fifth Embodiment

In the embodiments above, a configuration for gate blocking in the entire power converter 2 or a configuration for gate blocking of each sub module 7 included in an arm including failed sub module 7 is described. In a fifth embodiment, a configuration in which sub modules 7 included in an arm are categorized into a plurality of groups for sequential gate blocking of sub modules 7 belonging to a group will be described.

Figure 13:
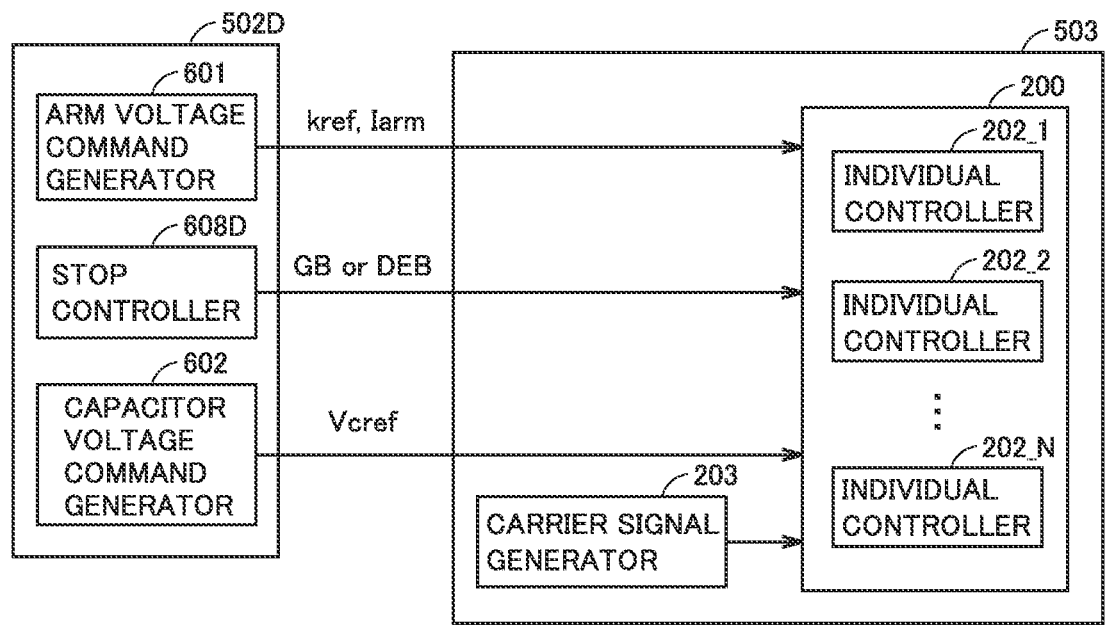
FIG. 13 is a diagram showing a configuration of a basic controller and the arm controller according to a fifth embodiment.

FIG. 13 is a diagram showing a configuration of a basic controller 502D and arm controller 503 according to the fifth embodiment. Referring to FIG. 13, basic controller 502D corresponds the configuration of basic controller 502 in FIG. 4 with stop controller 608 being replaced with a stop controller 608D. Though arm controller 503 is similar to arm controller 503 in FIG. 5, an individual controller group 200 is shown as a configuration including individual controllers 202_1 to 202_N.

A plurality of sub modules 7 in an arm are categorized into a plurality of groups. For the sake of facilitated description, it is assumed below that six sub modules 7 are included in an arm (that is, N=6) and sub modules 7_1 and 7_2, sub modules 7_3 and 7_4, and sub modules 7_5 and 7_6 are categorized into groups G1, G2, and G3, respectively. It is assumed that failure has occurred in sub module 7_3. Therefore, five sub modules 7_1, 7_2, 7_4, 7_5, and 7_6 in the arm are normal.

When stop controller 608D detects failure of sub module 7_3, for gate blocking of sub modules 7_1 and 7_2 belonging to group G1, it provides the GB command to individual controllers 202_1 and 202_2. Individual controller 202_3 turns on bypass switch 34 of sub module 7_3. Sub module 7_3 is thus bypassed.

Carrier signal generator 203 sets again reference phases of carrier signals of normal sub modules 7_1 and 7_2 belonging to group G1 such that intervals among the reference phases of the carrier signals of the plurality of normal sub modules 7 in the arm are equal. In this example, the intervals between the reference phases of the carrier signals of sub modules 7_1 and 7_2 are set to intervals calculated by dividing 360 degrees by the number (in this case, five) of normal sub modules 7 in the arm. The reference phase of the carrier signal of each of sub modules 7 belonging to groups G2 and G3 remains as the reference phase before failure.

When the carrier signal generator completes setting again of the carrier signals of normal sub modules 7_1 and 7_2 belonging to group G1 (for example, a notification indicating end of setting again is received from carrier signal generator 203), stop controller 608D provides a DEB command to individual controllers 202_1 to 202_2 to cancel stop of operations of sub modules 7_1 and 72 (that is, deblocking). Individual controllers 202_1 and 202_2 use the carrier signals set again to control the switching elements in sub modules 7_1 and 7_2 by PWM control.

In succession, after deblocking of sub modules 7_1 and 7_2 belonging to group G1, stop controller 608D provides the GB command to individual controller 202_4 for gate blocking of normal sub module 7_4 belonging to group G2. Carrier signal generator 203 sets again the reference phase of the carrier signal of normal sub module 7_4 belonging to group G2 such that intervals among the phases of the carrier signals of the plurality of normal sub modules 7 in the arm are equal.

When the carrier signal generator completes setting again of the carrier signal of normal sub module 7_4 belonging to group G2, stop controller 608D provides the DEB command to individual controller 202_4 to deblock sub module 7_4. Individual controller 202_4 uses the carrier signal set again to control the switching elements in sub module 7_4 by PWM control. Stop controller 608D may provide a GB command and a DEB command to individual controller 202_3 corresponding to failed sub module 7_3.

Then, after stop controller 608D deblocks sub module 7_4 belonging to group G2, it provides the GB command to individual controllers 202_5 and 202_6 for gate blocking of normal sub modules 7_5 and 7_6 belonging to group G3. Carrier signal generator 203 sets again the reference phases of the carrier signals of normal sub modules 7_5 and 7_6 belonging to group G3 such that the intervals among the phases of the carrier signals of the plurality of normal sub modules 7 are equal.

When the carrier signal generator completes setting again of the carrier signal, stop controller 608D provides the DEB command to individual controllers 202_5 and 202_6 to deblock sub modules 7_5 and 7_6. Individual controllers 202_5 and 202_6 use the carrier signals set again to control the switching elements of sub modules 7_5 and 7_6 by PWM control.

Control device 3 thus performs a series of processing including gate blocking, setting again of the carrier signals, and deblocking for each group so as to set again the carrier signals of all normal sub modules 7. Thus, even during gate blocking of at least one sub module 7 in the arm including failed sub module 7, sub module 7 not subjected to gate blocking can operate. Therefore, power converter 2 can continue operating with lowering in output power being minimized.

Each of a plurality of groups may include at least one sub module 7. Which sub module 7 is to be categorized into which group may be predetermined or may randomly be determined by control device 3.

Figure 14:
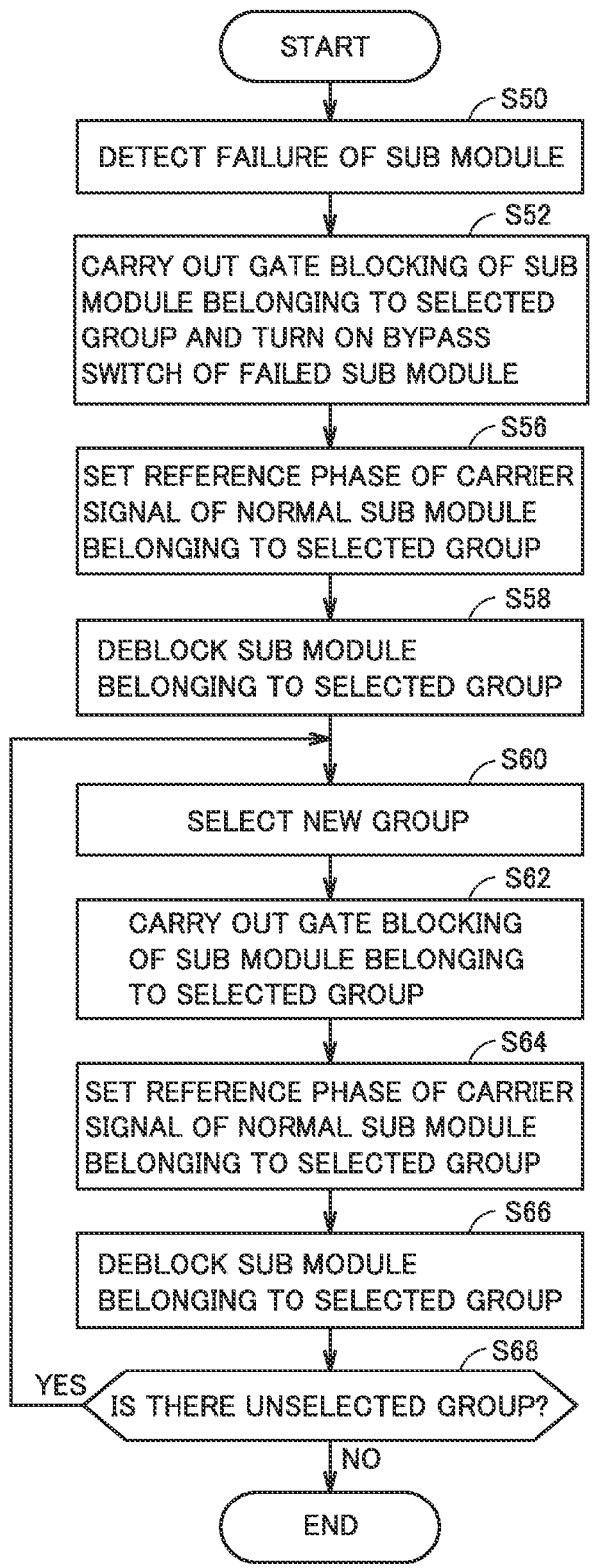
FIG. 14 is a flowchart showing a procedure of processing in the control device according to the fifth embodiment.

FIG. 14 is a flowchart showing a procedure of processing in control device 3 according to the fifth embodiment. Typically, each step below is performed by arithmetic processing unit 535 of control device 3.

Referring to FIG. 14, control device 3 detects failure of sub module 7_j in an arm based on normality determination signal cn from each sub module 7 in the arm (step S50). Control device 3 selects any one group from among a plurality of groups, carries out gate blocking of normal sub modules belonging to the selected group, and turns on bypass switch 34 of sub module 7_j failure of which was detected (step S52).

Control device 3 sets the reference phases of the carrier signals of normal sub modules belonging to the selected group such that the intervals among the reference phases of the carrier signals of the normal sub modules in the arm are equal (step S56). Control device 3 deblocks the normal sub modules belonging to the selected group (step S58).

Control device 3 selects a new unselected group from among the plurality of groups (step S60) and carries out gate blocking of normal sub modules belonging to the selected group (step S62). Control device 3 sets the reference phases of the carrier signals of the normal sub modules belonging to the selected group such that the intervals among the reference phases of the carrier signals of the plurality of normal sub modules in the arm are equal (step S64) and deblocks normal sub modules belonging to the selected group (step S66).

Control device 3 determines whether or not there is an unselected group among the plurality of groups (step S68). When there is an unselected group (YES in step S68), control device 3 proceeds to processing in step S60. When there is no unselected group (NO in step S68), control device 3 quits the process.

<Modification>

When the carrier signal is set again for each group as in the fifth embodiment, gate blocking of sub module 7 belonging to the group does not have to be carried out. Specifically, the switching operation may be stopped with on and off states of the switching elements in sub module 7 being fixed to bypass sub module 7 belonging to the group.

Figure 15:
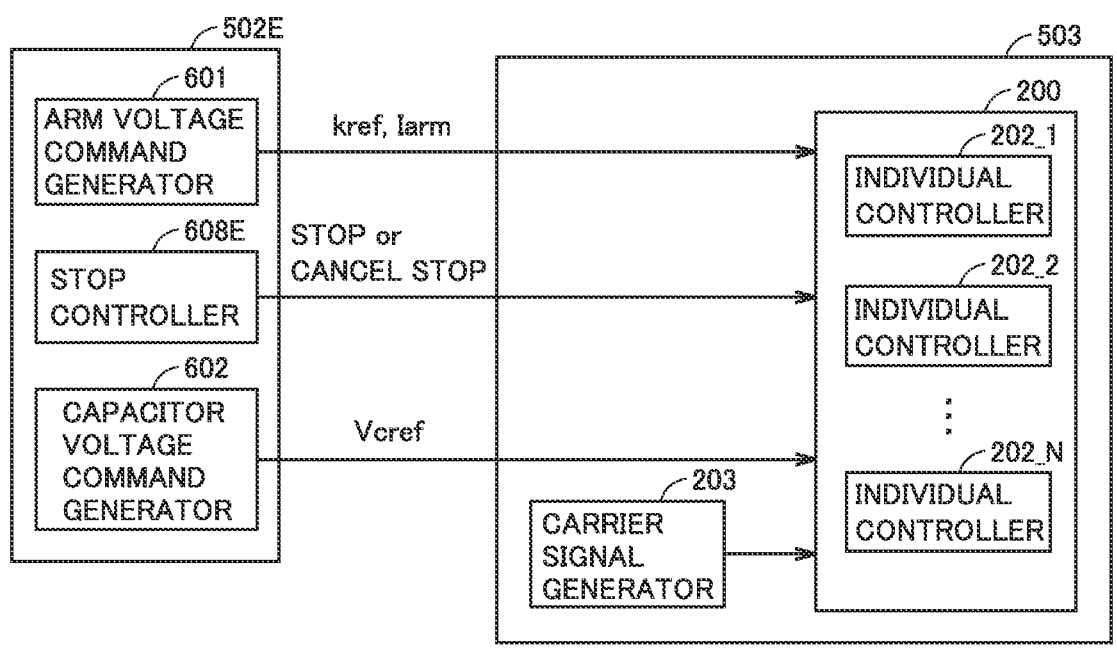
FIG. 15 is a diagram showing a configuration of a basic controller and the arm controller according to a modification of the fifth embodiment.

FIG. 15 is a diagram showing a configuration of a basic controller 502E and arm controller 503 according to a modification of the fifth embodiment. Referring to FIG. 15, basic controller 502E corresponds to the configuration of basic controller 502 in FIG. 4 with stop controller 608 being replaced with a stop controller 608E.

When stop controller 608E detects failure of sub module 7_3, it provides a command to bypass sub modules 7_1 and 7_2 belonging to group G1. Specifically, stop controller 608E provides to individual controllers 202_1 and 202_2, a stop command to stop the switching operations of switching elements 31p and 31n by fixing switching element 31p of sub module 7 in FIG. 2 to off and fixing switching element 31n to on. Individual controller 202_3 turns on bypass switch 34 of failed sub module 7_3 so as to have sub module 73 bypassed.

Carrier signal generator 203 sets the reference phases of the carrier signals of normal sub modules 7_1 and 7_2 belonging to group G1 such that the intervals among the phases of the carrier signals of the plurality of normal sub modules 7 in the arm are equal.

When the carrier signal generator completes setting again of the carrier signals, stop controller 608E provides a stop cancellation command to cancel stop of the switching operation to individual controllers 202_1 and 202_2. Fixing to the off state of switching element 31p and fixing to the on state of switching element 31n in each of sub modules 7_1 and 7_2 are thus canceled. Individual controllers 202_1 and 202_2 use the carrier signals set again to control sub modules 7_1 and 7_2 by PWM control.

In group G2 as well, the reference phase of the carrier signal of sub module 7_4 is set while sub module 7_4 is bypassed with switching element 31p being fixed to off and switching element 31n being fixed to on in normal sub module 7_4. Then, after the end of setting again of the carrier signal, fixing of switching element 31p to the off state and fixing of switching element 31n to the on state are canceled.

In group G3 as well, the reference phases of the carrier signals of sub modules 7_5 and 7_6 are set while sub modules 7_5 and 76 are bypassed with switching element 31p being fixed to off and switching element 31n being fixed to on in normal sub modules 7_5 and 7_6. Then, after the end of setting again of the carrier signal, fixing of switching element 31p to the off state and fixing of switching element 31n to the on state are canceled.

Control device 3 according to the modification of the fifth embodiment stops, for each of the plurality of groups, the switching operation of the plurality of switching elements included in normal sub modules 7 belonging to that group by fixing a switching element (for example, switching element 31n) connected in parallel to bypass switch 34 among a plurality of switching elements included in normal sub modules 7 belonging to the group to the on state and fixing a switching element (for example, switching element 31p) not connected in parallel to bypass switch 34 to the off state. Normal sub module 7 belonging to the group is thus bypassed. According to the modification, even while the switching operation is stopped with the on or off state of the switching element in at least one sub module 7 in an arm including failed sub module 7 being fixed, sub module 7 in which the on or off state of each switching element is not fixed can operate. Consequently, power converter 2 can continue operating with lowering in output power being minimized.

OTHER EMBODIMENTS (1) Though a configuration in which when individual controller 202 detects failure of sub module 7, bypass switch 34 of that sub module 7 is turned on is described in the embodiments above, limitation to the configuration is not intended. For example, individual controller 202 may turn on bypass switch 34 of failed sub module 7 upon receiving a command to turn on that bypass switch 34 from basic controller 502.

(2) The power conversion device described above can be used as a power conversion device for a power system such as high voltage direct current (HVDC) or static synchronous compensator (STATCOM).

(3) The configuration exemplified in the embodiments described above represents an exemplary configuration in the present disclosure, and it can be combined with another known technique or may be modified, for example, partially be omitted, within the scope not departing from the gist of the present disclosure. In the embodiments described above, the processing and the configuration described in other embodiments may be adopted and carried out as appropriate.

It should be understood that the embodiments disclosed herein are illustrative and non-restrictive in every respect. The scope of the present disclosure is defined by the terms of the claims rather than the description above and is intended to include any modifications within the scope and meaning equivalent to the terms of the claims.

REFERENCE SIGNS LIST 1 power conversion device; 2 power converter; 3 control device; 4u, 4v, 4w leg circuit; 5 upper arm; 6 lower arm; 7 sub module; 8A, 8B reactor; 9A, 9B arm current detector; 10 AC voltage detector; 11A, 11B DC voltage detector; 12 AC circuit; 13 transformer; 14 DC circuit; 16 AC current detector; 31n, 31p switching element; 32 power storage element; 33 voltage detector; 34 bypass switch; 200 individual controller group; 202 individual controller; 203 carrier signal generator; 501 switching controller; 502 basic controller; 503 arm controller; 530 AD converter unit; 531 analog filter; 532 AD converter; 535 arithmetic processing unit; 536 CPU; 537 memory; 538, 539 bus interface; 540 bus; 543 IO unit; 544 communication circuit; 545 digital input circuit; 546 digital output circuit; 547 display unit; 548 touch panel; 555 optical repeater; 601 arm voltage command generator; 602 capacitor voltage command generator; 603 AC current controller; 604 circulating current calculator; 605 circulating current controller; 606 command distributor; 608 stop controller; 2021 balance controller; 2022 PWM modulator; 2023 signal switch; 2051 adder

The invention claimed is:

1. A power conversion device comprising:
a power converter including a plurality of arms, each arm including a plurality of sub modules connected in series; and
a control device to control voltages of the plurality of sub modules by PWM control using a carrier signal for each sub module,
the sub module including a plurality of switching elements, a power storage element, a pair of output terminals, and a bypass switch to bypass the sub module, wherein
when the control device detects failure of one or more sub modules among the sub modules included in the arm, the control device performs stop processing for turning off the sub modules included in the arm and has the sub module failure of which was detected bypassed, and
after the control device performs the stop processing, the control device equalizes uneven intervals among phases of carrier signals of a plurality of normal sub modules in the arm caused by failure of the one or more sub modules.

2. The power conversion device according to claim 1, wherein
the control device sets a reference phase of a carrier signal for each sub module and generates the carrier signal having the set reference phase, and
when the control device detects failure of the one or more sub modules, the control device equalizes intervals among reference phases of the carrier signals of the plurality of normal sub modules in the arm.

3. The power conversion device according to claim 1, wherein
when output power from the power converter is equal to or higher than a first threshold value at time of detection of failure of the one or more sub modules in the arm and a predetermined condition is satisfied, the control device performs the stop processing, and
when output power from the power converter is lower than the first threshold value at the time of detection of failure of the one or more sub modules in the arm, the control device performs the stop processing regardless of the predetermined condition.

4. The power conversion device according to claim 1, wherein
when the control device detects failure of the one or more sub modules in the arm, the control device gradually lowers output power from the power converter, and when output power becomes lower than a second threshold value, the control device performs the stop processing.

5. The power conversion device according to claim 1, wherein
the stop processing for turning off the sub modules includes setting the plurality of switching elements included in each of the sub modules to an off state.

6. The power conversion device according to claim 1, wherein
the stop processing for turning off the sub modules includes setting the plurality of switching elements included in each of sub modules to an off state, and
when the control device detects failure of the sub module in the arm, the control device performs the stop processing at timing when a voltage command value for the arm becomes equal to or larger than a first command value and controls an arm current that flows through the arm to flow in a positive direction, or performs the stop processing at timing when the voltage command value for the arm becomes smaller than a second command value smaller than the first command value and controls the arm current that flows through the arm to flow in a negative direction.

7. A power conversion device comprising:
a power converter including a plurality of arms, each arm including a plurality of sub modules connected in series, and
a control device to control voltages of the plurality of sub modules by PWM control using a carrier signal for each sub module,
the sub module including a plurality of switching elements, a power storage element, a pair of output terminals, and a bypass switch to bypass the sub module, wherein
the sub modules in the arm are categorized into a plurality of groups, when the control device detects failure of the sub module in the arm, the control device stops the switching operation of the plurality of switching elements included in a sub module belonging to a first group, sets a phase of a carrier signal of a normal sub module belonging to the first group so as to equalize intervals among phases of carrier signals of a plurality of normal sub modules in the arm, and restarts the switching operation after setting the phase of the carrier signal of the normal sub module belonging to the first group, and after the switching operation is restarted, the control device stops the switching operation of the plurality of switching elements included in a sub module belonging to a second group, sets a phase of a carrier signal of a normal sub module belonging to the second group so as to equalize intervals among phases of carrier signals of a plurality of normal sub modules in the arm, and restarts the switching operation after setting the phase of the carrier signal of the normal sub module belonging to the second group.

8. The power conversion device according to claim 7, wherein
the stop of the switching operation of the plurality of switching elements included in a sub module belonging to each group of the plurality of groups includes setting the plurality of switching elements to an off state.

9. The power conversion device according to claim 7, wherein
the control device stops, for each of the plurality of groups, the switching operation of the plurality of switching elements included in a normal sub module belonging to the group, by fixing the switching element connected in parallel to the bypass switch to an on state among the plurality of switching elements included in the normal sub module belonging to the group and fixing the switching element not connected in parallel to the bypass switch to an off state.

10. The power conversion device according to claim 2, wherein
when output power from the power converter is equal to or higher than a first threshold value at time of detection of failure of the one or more sub modules in the arm and a predetermined condition is satisfied, the control device performs the stop processing, and
when output power from the power converter is lower than the first threshold value at the time of detection of failure of the one or more sub modules in the arm, the control device performs the stop processing regardless of the predetermined condition.

11. The power conversion device according to claim 2, wherein
when the control device detects failure of the one or more sub modules in the arm, the control device gradually lowers output power from the power converter, and when output power becomes lower than a second threshold value, the control device performs the stop processing.

12. The power conversion device according to claim 2, wherein
the stop processing for turning off the sub modules includes setting the plurality of switching elements included in each of the sub modules to an off state.

13. The power conversion device according to claim 3, wherein
the stop processing for turning off the sub modules includes setting the plurality of switching elements included in each of the sub modules to an off state.

14. The power conversion device according to claim 4, wherein
the stop processing for turning off the sub modules includes setting the plurality of switching elements included in each of the sub modules to an off state.

15. The power conversion device according to claim 2, wherein
the stop processing for turning off the sub modules includes setting the plurality of switching elements included in each of sub modules to an off state, and
when the control device detects failure of the sub module in the arm, the control device performs the stop processing at timing when a voltage command value for the arm becomes equal to or larger than a first command value and controls an arm current that flows through the arm to flow in a positive direction, or performs the stop processing at timing when the voltage command value for the arm becomes smaller than a second command value smaller than the first command value and controls the arm current that flows through the arm to flow in a negative direction.

16. The power conversion device according to claim 3, wherein
the stop processing for turning off the sub modules includes setting the plurality of switching elements included in each of sub modules to an off state, and
when the control device detects failure of the sub module in the arm, the control device performs the stop processing at timing when a voltage command value for the arm becomes equal to or larger than a first command value and controls an arm current that flows through the arm to flow in a positive direction, or performs the stop processing at timing when the voltage command value for the arm becomes smaller than a second command value smaller than the first command value and controls the arm current that flows through the arm to flow in a negative direction.

17. The power conversion device according to claim 4, wherein
the stop processing for turning off the sub modules includes setting the plurality of switching elements included in each of sub modules to an off state, and
when the control device detects failure of the sub module in the arm, the control device performs the stop processing at timing when a voltage command value for the arm becomes equal to or larger than a first command value and controls an arm current that flows through the arm to flow in a positive direction, or performs the stop processing at timing when the voltage command value for the arm becomes smaller than a second command value smaller than the first command value and controls the arm current that flows through the arm to flow in a negative direction.

* * * * *